(12) United States Patent
Pastre et al.

(10) Patent No.: US 12,204,344 B2
(45) Date of Patent: Jan. 21, 2025

(54) METHOD AND SYSTEM FOR CALCULATING THE LATERAL TRAJECTORY OF AN AIRCRAFT

(71) Applicant: Airbus Operations SAS, Toulouse (FR)

(72) Inventors: Thomas Pastre, Toulouse (FR); Jérôme Arnoux, Toulouse (FR); Miguel Consiglieri Pedroso Mendes Dias, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 275 days.

(21) Appl. No.: 17/730,310

(22) Filed: Apr. 27, 2022

(65) Prior Publication Data

US 2022/0350346 A1 Nov. 3, 2022

(30) Foreign Application Priority Data

Apr. 29, 2021 (FR) ........................................ 2104509

(51) Int. Cl.
*G05D 1/00* (2024.01)
(52) U.S. Cl.
CPC ........... *G05D 1/0607* (2013.01); *G05D 1/042* (2013.01); *G05D 1/101* (2013.01)
(58) Field of Classification Search
CPC ...... G05D 1/0607; G05D 1/042; G05D 1/101; G05D 1/0833; G01C 23/00; G08G 5/045; G08G 5/0034; G08G 5/0052; G08G 5/0086; G08G 5/0091; G08G 5/0021
See application file for complete search history.

(56) References Cited

U.S. PATENT DOCUMENTS

| 6,424,889 B1 | 7/2002 | Bonhoure et al. |
| 11,080,929 B2 * | 8/2021 | Querejeta Masaveu ..................... G08G 5/0021 |
| 2019/0108680 A1 | 4/2019 | Querejeta Masaveu et al. |

OTHER PUBLICATIONS

French Search Report; priority document.
(Continued)

*Primary Examiner* — Jess Whittington
*Assistant Examiner* — Brian E Yang
(74) *Attorney, Agent, or Firm* — Greer, Burns & Crain, Ltd.

(57) ABSTRACT

An automatic trajectory generation system bringing a flying aircraft from a current position to a destination which: obtains polygons representing obstacles potentially encountered, each polygon associated with an altitude layer; defines two first tangential circles relative to a current direction of the aircraft flight, centered on the right and the left, relative to the aircraft current position; defining two second circles tangential relative to a direction to be followed to destination, centered on the right and the left, relative to the georeferenced destination position; defines a third circle around vertices of the polygons; and searches for a flyable lateral trajectory between the aircraft current position and the destination by bypassing the polygons by the vertices in searching for tangential trajectories between the circles, by observing a pre-established vertical trajectory profile, as well as the lateral margin and a vertical margin with the polygons.

9 Claims, 16 Drawing Sheets

(56) References Cited

OTHER PUBLICATIONS

E. D'Amato et al., "Bi-level Flight Path Planning of UAV Formations with Collision Avoidance" Department of Engineering, University of Campania, Journal of Intelligent & Robotic Systems, Aversa, Itlay, Sep. 30, 2017; 19 pages.

E. D'Amato et al., "Optimal Flight Paths over Essential Visibility Graphs" 2018 International Conference of Unmanned Aircraft Systems (ICUAS), Dallas, TX, USA; Jun. 12-15, 2018; 7 pages.

* cited by examiner

Fig. 12A
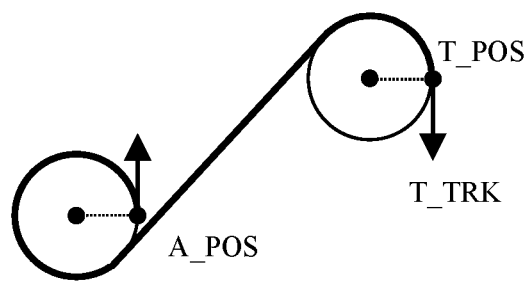
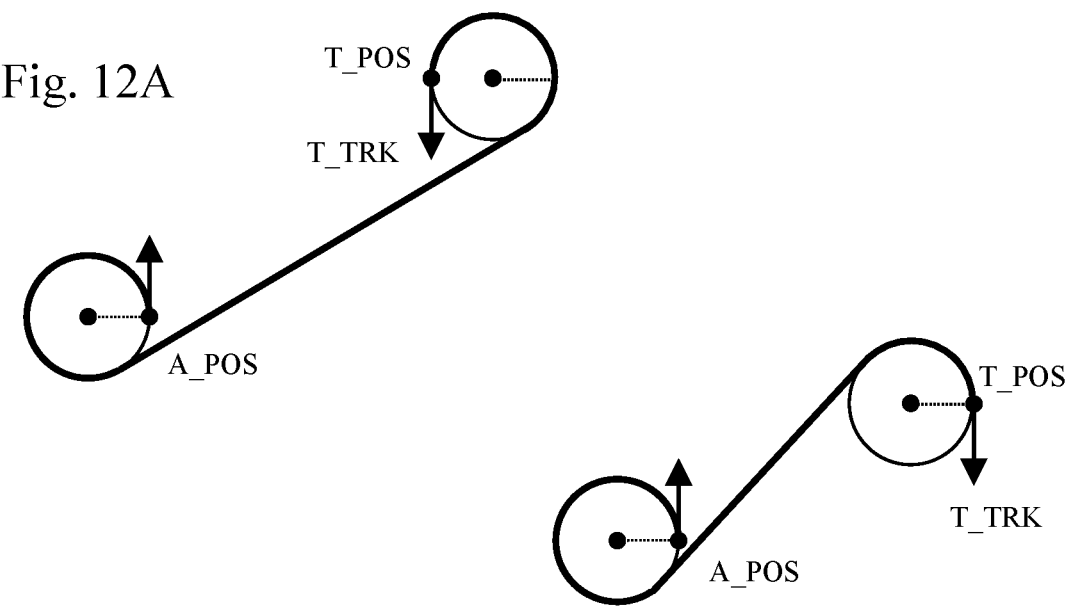
Fig. 12B
Fig. 12C
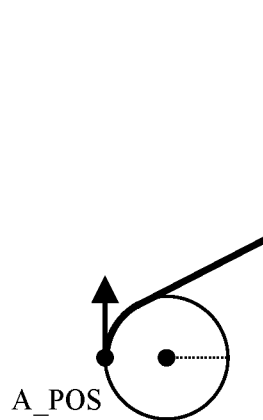
Fig. 12D
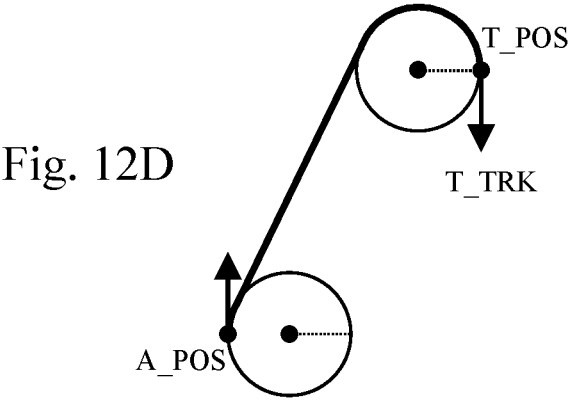

METHOD AND SYSTEM FOR CALCULATING THE LATERAL TRAJECTORY OF AN AIRCRAFT

CROSS-REFERENCES TO RELATED APPLICATIONS

This application claims the benefit of the French patent application No. 2104509 filed on Apr. 29, 2021, the entire disclosures of which are incorporated herein by way of reference.

FIELD OF THE INVENTION

The present invention relates to a system for calculating in real time a trajectory to be followed to have an aircraft transit along a vertical trajectory profile to be observed, from a current geographic position in flight, to a georeferenced destination, and according to a direction to be followed to destination.

BACKGROUND OF THE INVENTION

When an aircraft is in flight, it may be desirable to provide automatic assistance in order to automatically determine a trajectory which makes it possible to bring the aircraft to a georeferenced position. Many obstacles have to be taken into account in determining a trajectory which is flyable: the relief of the terrain, the meteorological obstacles, the military zones for which overflight is prohibited, the operational state of the aircraft (cabin depressurization, engine out of service, etc.). A flyable trajectory is a trajectory which at all points offers a minimum (or predetermined) distance margin with respect to any identified obstacle (relief, etc.) and that the aircraft can follow given its operational state (possible depressurization, loss of an engine, etc.). It is notably desirable to provide such automatic assistance in the context of drone piloting.

The document U.S. Pat. No. 6,424,889 B1 discloses a method for generating a horizontal hazardous zone avoidance trajectory for an aircraft.

In the current state of the art, automatically determining, in real time, such a trajectory requires major processing resources, and above all significant computation time. It is therefore desirable to overcome these drawbacks of the state of the art.

It is notably desirable to provide a solution that makes it possible to determine a safe trajectory to be followed to bring an aircraft currently in flight, from its current geographic position to a georeferenced destination by observing a pre-established vertical trajectory profile. It is more particularly desirable to provide a solution which makes it possible to determine this trajectory within a short time. It is also desirable to provide a solution which makes it possible to indicate if such a trajectory exists.

SUMMARY OF THE INVENTION

An object of the present invention is to propose a method for generating a trajectory to bring an aircraft in flight from a current position of the aircraft to a destination having a georeferenced position, the method being implemented by a system for automatically generating a trajectory in the form of electronic circuitry embedded in the aircraft, the method comprising the following steps: obtaining polygons representative of obstacles potentially encountered by the aircraft from the current position of the aircraft to the destination, each polygon being associated with an altitude layer in which the obstacle is included in the polygon; defining two first circles that are tangential with respect to a current direction of flight of the aircraft, one being centered on the right, the other being centered on the left, with respect to the current position of the aircraft, the radius of the first circles being a minimum turn radius that the aircraft can perform in light of its operational state; defining two second circles that are tangential with respect to a direction to be followed to destination, one being centered on the right, the other being centered on the left, to the georeferenced position of the destination; defining a third circle around vertices of the polygons, of radius equal to the maximum between a predetermined lateral margin and a turn radius that the aircraft can perform in light of its speed on arrival at the vertex of the polygon; searching for a flyable lateral trajectory between the current position of the aircraft and the destination by bypassing the polygons by the vertices, by searching for tangential directories between the circles, by observing a pre-established vertical trajectory profile, the current direction of flight of the aircraft and the direction to be followed to destination, as well as the predetermined lateral margin and a predetermined vertical margin with the polygons; and, for at least one polygon edge, the method also comprises the following steps:

- calculating a distance between the current position of the aircraft and each polygon edge;
- when the vertical trajectory profile corresponds to a climb, determining, as a function of the vertical trajectory profile, whether, after having travelled the distance to the edge minus the lateral margin, the altitude of the aircraft is greater than that of the edge plus the vertical margin, and, if such is the case, excluding the edge from the search for a flyable lateral trajectory; or
- when the vertical trajectory profile corresponds to a descent, determining, as a function of the vertical trajectory profile, whether, after having travelled the distance to the edge plus the lateral margin, the altitude of the aircraft is lower than that of an altitude layer below the edge plus the vertical margin, and, if such is the case, excluding the edge from the search for a flyable lateral trajectory. Thus, by virtue of the definition of the circles, the search for a flyable trajectory is simplified, which reduces the time needed to find such a trajectory.

According to a particular embodiment, the method further comprises the following successive steps: expanding the polygons by the predetermined lateral margin in all the directions; merging the polygons which touch or overlap by altitude layer; retracting the polygons by the predetermined lateral margin in all the directions.

According to a particular embodiment, the method further comprises the following steps:

- searching for a flyable tangential trajectory between one the first circle and one the second circle, by observing the pre-established vertical trajectory profile, the current direction of flight of the aircraft and the direction to be followed to destination, as well as the predetermined lateral margin and a predetermined vertical margin with the polygons; searching for the flyable trajectory, from the current position of the aircraft to the position of the destination, by bypassing polygon vertices when no tangential flyable trajectory between one first circle and one second circle has been found.

According to a particular embodiment, the method further comprises the following steps:

determining candidate trajectories by progression from circle to circle among the circles and storing the candidate trajectories in a list; choosing from the list L a candidate trajectory to be continued which is the most promising in light of a cost function F such that:

$$F=G+H$$

in which G is a distance travelled to the current end of the candidate trajectory and H is a path search heuristic which underestimates the distance still to be travelled to the destination.

According to a particular embodiment, the method further comprises the following steps: when the automatic trajectory generation system has found a first safe candidate trajectory P1 to a polygon vertex V, saving its distance value G, denoted Gv; when the automatic trajectory generation system finds a second candidate trajectory P2 which envisages meeting the vertex V to bypass it with a current distance value G, denoted Gp, testing the following condition:

$$Gp+dmin>Gv$$

in which dmin is a lower limit of path length between the position at which the trajectory considered stops and the vertex V. And, when the condition is fulfilled, conserving the unchanged list, and otherwise, replacing the first candidate trajectory P1 with the second candidate trajectory P2 in the list.

According to a particular embodiment, the method further comprises the following steps: when the automatic trajectory generation system has found a candidate trajectory to a polygon vertex, calculating the sum of the current value G of the candidate trajectory concerned plus the distance to the third circle from the vertex concerned plus the distance from this third circle to one second circle; aborting the expansion of the candidate trajectory to the polygon vertex if the calculated sum is greater than the value of the cost function F of a trajectory already found to bring the aircraft from a current position to the destination.

According to a particular embodiment, the method comprises the following step: keeping only the polygons of the layers which are relevant in light of a constant altitude or of an altitude interval defined by the vertical trajectory profile.

According to a particular embodiment, only the corners furthest to the right and to the left of an obstacle are considered to perform a bypassing of the obstacle.

According to a particular embodiment, the method further comprises the following steps, for at least one polygon representative of a meteorological obstacle moving at a speed vObst in a direction Dobst: calculating a distance Lext as follows:

$$Lext = vObst * \frac{d_{max} - d_e}{A\_VEL}$$

in which dmax represents the maximum distance to the third circle centered on a vertex of the polygon concerned and de represents a Euclidian distance considered by calculating a time of arrival T0 on the vertex and a real maximum time tmax of arrival on the vertex; extending the dimensions of the polygon concerned by applying to each vertex a shift equal to the distance Lext in the direction Dobst as soon as this shift displaces the vertex outward from the polygon concerned.

According to a particular embodiment, the method further comprises the following steps: calculating a distance Lextc as follows:

$$Lext_c = vObst * \frac{\alpha * R}{A\_VEL}$$

in which α is a maximum turn angle, expressed in radians, that the aircraft can perform from the vertex of the polygon concerned and R represents the turn radius that the aircraft can perform; extending the dimensions of the polygon by applying a shift equal to the sum of the distance Lext and of the additional distance Lextc as soon as this shift displaces the vertex outward from the polygon concerned.

Also proposed is a computer program comprising instructions for implementing the method described above according to any one of its embodiments, when the instructions are executed by a processor. Also proposed is an information storage medium storing instructions for implementing the method described above according to any one of its embodiments, when the instructions are read from the information storage medium and executed by a processor.

Also proposed is an automatic trajectory generation system for bringing an aircraft in flight from a current position of the aircraft to a destination having a georeferenced position, the system comprising electronic circuitry configured to implement the following steps: obtaining polygons representative of obstacles potentially encountered by the aircraft from the current position of the aircraft to the destination, each polygon being associated with an altitude layer in which the obstacle is included in the polygon; defining two first circles that are tangential with respect to a current direction of flight of the aircraft, one being centered on the right, the other being centered on the left, with respect to the current position of the aircraft, the radius of the first circles being a minimum turn radius that the aircraft can perform in light of its operational state; defining two second circles that are tangential with respect to a direction to be followed to destination, one being centered on the right, the other being centered on the left, with respect to the georeferenced position of the destination; defining a third circle around vertices of the polygons, of radius equal to the maximum between a predetermined lateral margin and a turn radius that the aircraft can perform in light of its speed on arrival at the vertex of the polygon; searching for a flyable lateral trajectory between the current position of the aircraft and the destination by bypassing the polygons by the vertices by searching for tangential trajectories between the circles, by observing a pre-established vertical trajectory profile, the current direction of flight of the aircraft and the direction to be followed to destination, as well as the predetermined lateral margin and a predetermined vertical margin with the polygons; and, for at least one polygon edge, the system comprises electronic circuitry configured to implement the following steps:

calculating a distance between the current position of the aircraft and each polygon edge;

when the vertical trajectory profile corresponds to a climb, determining, as a function of the vertical trajectory profile, whether, after having travelled the distance to the edge minus the lateral margin, the altitude of the aircraft is greater than that of the edge plus the vertical margin, and, if such is the case, excluding the edge from the search for a flyable lateral trajectory; or when the vertical trajectory profile corresponds to a descent, determining, as a function of the vertical trajectory profile, whether, after having travelled the distance to the edge plus the lateral margin, the altitude of the aircraft is lower than that of an altitude layer below the edge plus the vertical margin, and, if such is the case, excluding the edge from the search for a flyable lateral trajectory.

Also proposed are avionics incorporating an automatic trajectory generation system described above. Also proposed is an aircraft comprising such avionics.

BRIEF DESCRIPTION OF THE DRAWINGS

The features of the invention mentioned above, and others, will emerge more clearly on reading the following description of at least one exemplary embodiment, the description being given in relation to the attached drawings, in which:

FIG. 12A schematically illustrates a first trajectory pattern between a current position of the aircraft and a destination to be reached;

FIG. 12B schematically illustrates a second possible trajectory pattern between a current position of the aircraft and a destination to be reached;

FIG. 12C schematically illustrates a third possible trajectory pattern between a current position of the aircraft and a destination to be reached;

FIG. 12D schematically illustrates a fourth possible trajectory pattern between a current position of the aircraft and a destination to be reached;

DETAILED DESCRIPTION OF THE PREFERRED EMBODIMENTS

Figure 1:
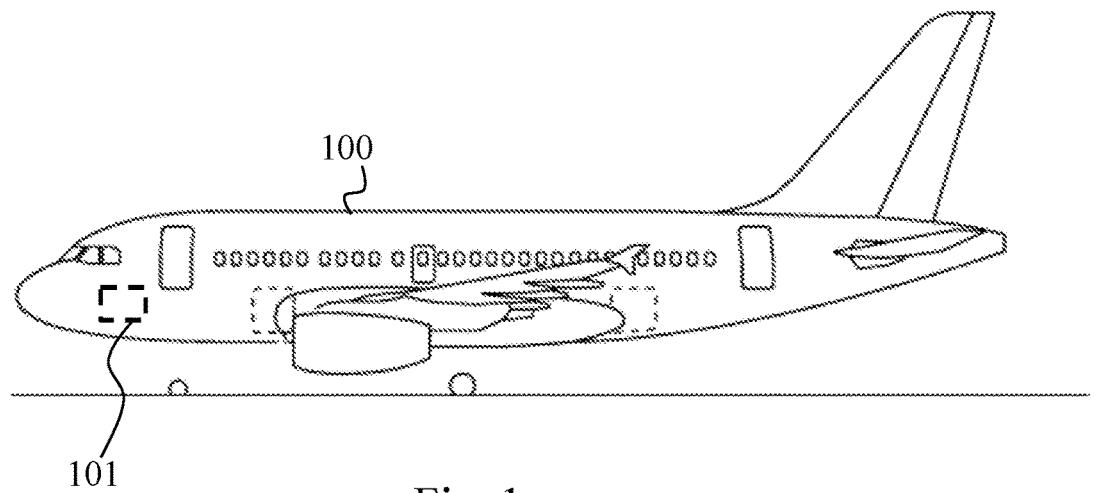
FIG. 1 schematically illustrates, by a side view, an aircraft equipped with an automatic trajectory generation system.

FIG. 1 schematically illustrates, by a side view, an aircraft 100 equipped with an automatic trajectory generation system ATG (Automatic Trajectory Generator) 101.

The ATG system 101 is embedded electronic equipment. For example, the ATG system 101 forms part of electronic circuitry of the avionics of the aircraft 100. Preferentially, the ATG system 101 is incorporated in a computer of the aircraft 100, for example the flight management system FMS of the aircraft 100, or another trajectory computation system distinct from the flight management system FMS.

The ATG system 101 is a piloting assistance system for determining, in real time, a safe, flyable trajectory to be followed to bring the aircraft 100, when the latter is in flight, from its current geographic position to a georeferenced destination, such as, for example, an aircraft or the current position of an aircraft carrier.

Figure 2:
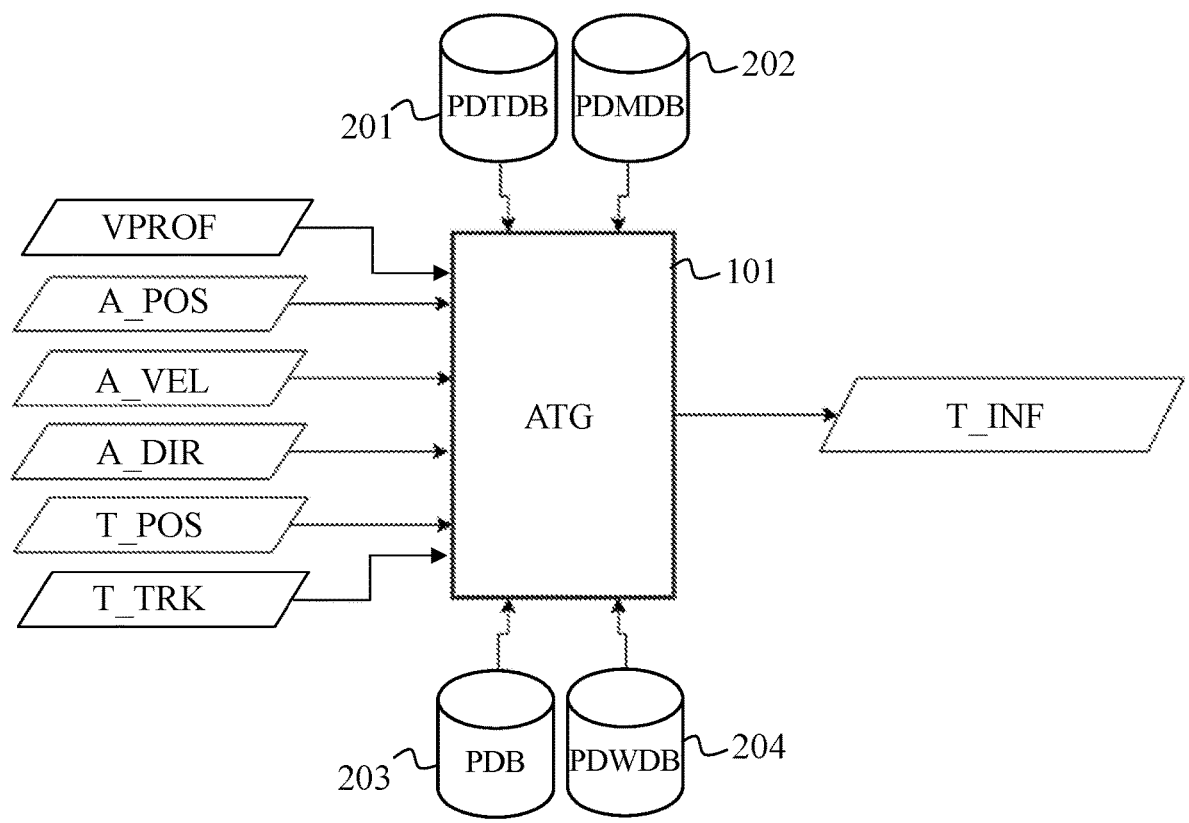
FIG. 2 schematically illustrates the automatic trajectory generation system.

The ATG system 101 is schematically illustrated in FIG. 2. The ATG system 101 is configured to take as input a set of information supplied by the avionics: the current geographic position of the aircraft 100 (denoted A_POS), the current velocity or speed of the aircraft 100 (denoted A_VEL), the current direction of flight of the aircraft 100 (denoted A_DIR) as defined by the attitude of the aircraft 100, geographic position information on the destination (denoted T_POS) and direction information to be followed to destination (denoted T_TRK). The ATG system 101 is configured to also take as input a vertical trajectory profile to be observed to destination (denoted VPROF). The ATG system 101 is configured to supply as output trajectory information (denoted T_INF).

It is recalled here that the flyable trajectory is a trajectory which at all points offers a minimum (or predetermined) distance margin with respect to any identified obstacle (relief, etc.) and that the aircraft 100 can follow given its operational state (possible depressurization, loss of an engine, etc.).

To determine the trajectory information T_INF, the ATG system 101 also has information supplied by a set of databases. More particularly: a PDTDB database (PDTDB standing for "Polygon Digital Terrain DataBase") 201, which supplies terrain elevation information in the form of polygons by altitude strata; a PDMDB database (PDMDB standing for "Polygon Digital Military DataBase") 202, which supplies georeferencing information, preferentially by altitude strata, in the form of polygons of military zones from which overflight is prohibited; a PDWDB database (PDWDB standing for "Polygon Digital Weather DataBase") 204, which supplies georeferenced information in the form of polygons, preferentially by altitude strata, of zones to be avoided because of meteorological conditions (storm clouds, etc.); and a PDB database (PDB standing for "Performance DataBase") 203, which supplies performance information on the aircraft 100 according to its operational state.

The abovementioned databases can be totally incorporated in the computing system of the aircraft 100. Before take-off, the databases are updated, for example using an electronic flight bag EFB. The databases can be incorporated in a computing system on the ground, for example a computer center of an airline for which the aircraft 100 operates. The updating of the databases is then done using air-ground communications AGC. These two approaches can be combined, with a preloading of the databases before take-off and updates in flight, for example to take account of real-time data changes (weather conditions, etc.).

The PDTDB database 201 contains descriptors of polygons representing terrain layers. Each polygon is thus associated with an altitude layer (between a lower layer limit and an upper layer limit) The set of polygons is a quantification (approximation) of the terrain and entirely encompasses the real terrain, which means that if a trajectory avoids these polygonal obstacles, the application of this trajectory in the real world also avoids the relief of the terrain.

The polygons representing a terrain layer must do so faithfully, which means that they cannot enlarge the terrain to the point that flyable zones are considered as obstacles and that safe trajectories are then considered dangerous and rejected by the ATG system 101. Furthermore, seen from above, the polygons representing the terrain of a layer must be entirely surrounded by polygons representing the terrain in the lower layers. This requirement is necessary to assume the higher an aircraft is, the less constraining is the relief of the terrain, which makes it possible to make calculation simplifications which speed up the search for trajectories.

Likewise, the military zones of the PDMDB database 202 and the meteorological obstacles of the PDWDB database 204 are represented in the form of polygons which result from a quantification (approximation) of these military zones and of these meteorological obstacles. For example, a polygon representing an obstacle of storm cloud type is associated with one or more altitude layers, thus making it possible to explore trajectories passing above or below the meteorological obstacle.

In the case of the military zones, a variable is preferentially associated with the descriptors of the corresponding polygons and indicates whether the military zone is open (overflight authorized) or closed (overflight prohibited). This variable can be transmitted by radio to the aircraft 100 in flight to notify a change of status (open/closed) of such or such a military zone in real time.

Each polygon is defined by its edges and is associated with a floor altitude and a ceiling altitude (layer). Consequently, the databases store polygon descriptors, comprising edge descriptors including, for example, the following information:
    Longitude and latitude of a vertex of the edge
    Longitude and latitude of the other vertex of the edge
    Floor altitude of the layer
    Ceiling altitude of the layer
    Identifier of polygon to which the edge belongs
    Identifier of edge within the polygon.

Each polygon descriptor can thus be composed of consecutive edge descriptors, preferentially presented, in ordered fashion, in the clockwise direction or in the counter-clockwise direction in covering the periphery of the polygon concerned.

In the case of meteorological obstacles, the corresponding polygon descriptors contain, for example, the following information:
    Date stamp
    Overall speed of the obstacle, with direction of movement
    Growth factor.

Furthermore, for more details, each edge descriptor of the meteorological obstacle polygon can contain information on velocity, or speed, of each vertex of the edge. Thus, through this information, the ATG system 101 is able to extrapolate, from the instant given by the date stamp and using a meteorological model, dynamic changes of form of the polygons concerned.

Additional information can potentially be stored if used frequently and if that allows computation time to be saved. For example, each edge descriptor can indicate whether the polygon is convex or concave at the first vertex, or if the edge belongs or does not belong to a convex envelope of the polygon.

Thus, when the ATG system 101 performs a real-time computation of a trajectory to be followed to have the aircraft 100 transferred from the current geographic position in flight, to a georeferenced destination, the ATG system 101 manipulates the polygons as disclosed hereinbelow.

Figure 3:
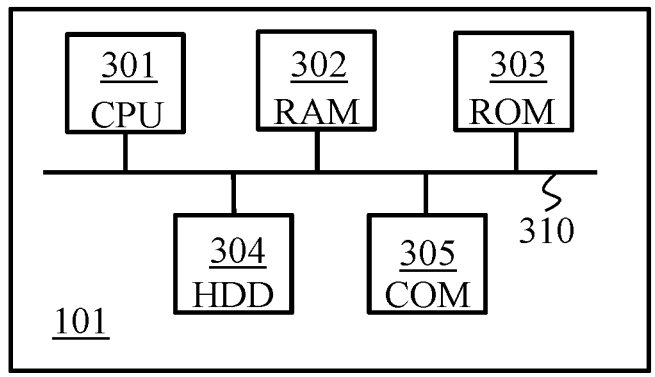
FIG. 3 schematically illustrates an example of hardware architecture of the automatic trajectory generation system.

FIG. 3 schematically illustrates an example of hardware architecture of the ATG system 101, which then comprises, linked by a communication bus 310: a processor or CPU (Central Processing Unit) 301; a RAM (Random Access Memory) memory 302; a ROM (Read Only Memory) memory 303, for example a Flash memory; a data storage device, such as an HDD (Hard Disk Drive) hard disk, or a storage medium reader, such as an SD (Secure Digital) card reader 304; at least one communication interface 305 allowing the ATG system 101 to interact in the avionics of the aircraft 100.

The processor 301 is capable of executing instructions loaded into the RAM 302 from the ROM 303, from an external memory (not represented), from a storage medium, such as an SD card, or from a communication network (not represented). When the ATG system 101 is powered up, the processor 301 is capable of reading instructions from the RAM 302 and of executing them. These instructions form a computer program causing the implementation, by the processor 301, of the behaviors, steps and algorithms described here.

All or part of the behaviors, steps and algorithms described here can thus be implemented in software form by the execution of a set of instructions by a programmable machine, such as a DSP (Digital Signal Processor) or a microcontroller, or be implemented in hardware form by a machine or a dedicated component (or chip) or a dedicated set of components (or chips), such as an FPGA (Field-Programmable Gate Array) or an ASIC (Application-Specific Integrated Circuit). Generally, the ATG system 101 comprises electronic circuitry arranged and configured to implement the behaviors, steps and algorithms described here.

Figure 4:
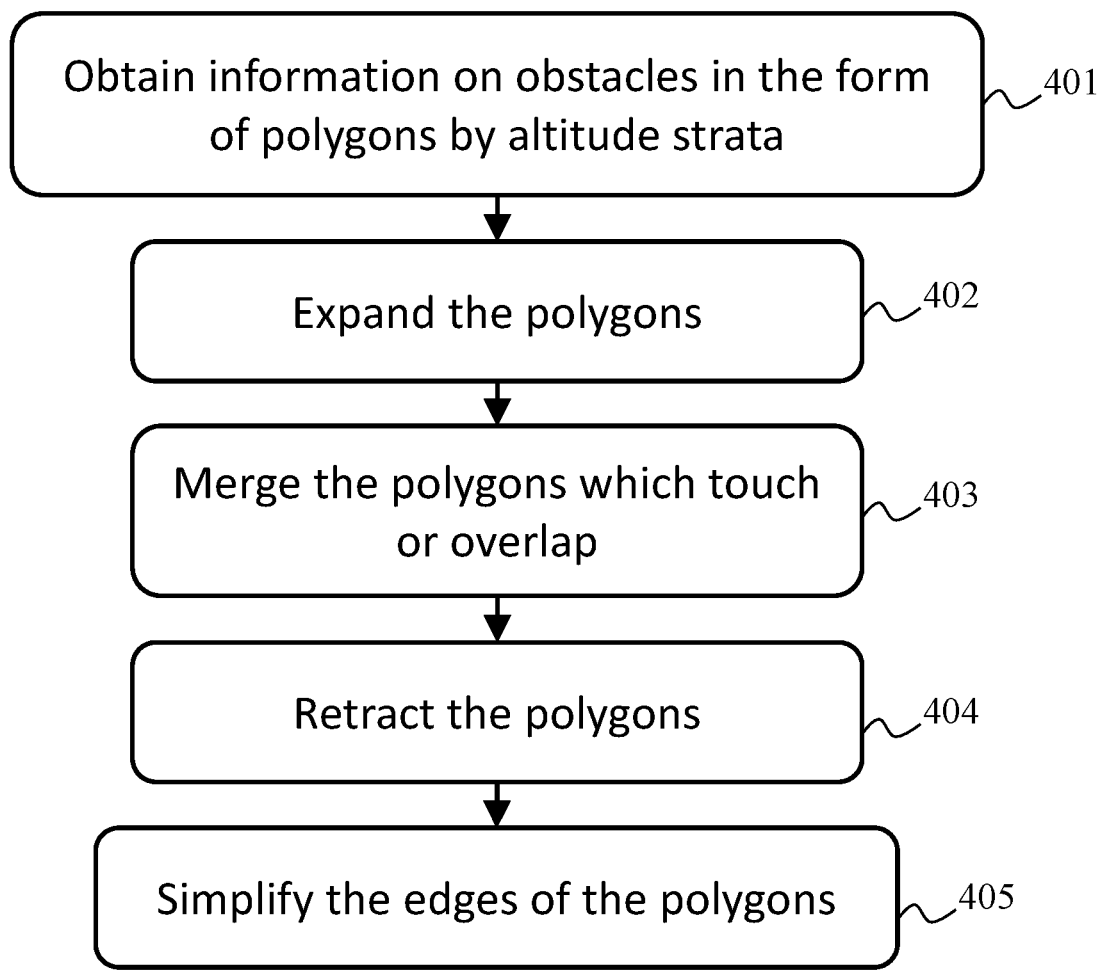
FIG. 4 schematically illustrates an algorithm for simplifying a set of polygons.

To perform the trajectory calculation, the ATG system 101 manipulates the polygons so as to limit the quantity of candidate trajectories studied. Thus, FIG. 4 schematically illustrates an algorithm for simplifying the set of polygons implemented, in a particular embodiment, by the ATG system 101 to potentially merge certain polygons. The ATG system 101 performs an expansion-retraction operation, which makes it possible to merge the polygons which are too close to one another to make it possible in reality to have the aircraft 100 navigate between the obstacles that they represent, while observing a protection corridor. These operations of expansion, merging and retraction of the polygons are preferentially performed upstream of a search for a flyable trajectory for the aircraft 100, and not in real time, in order to limit the computation times.

Figure 7:
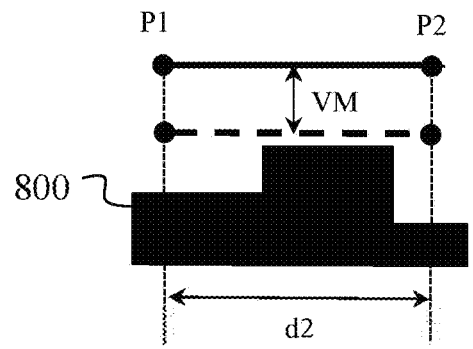
FIG. 7 schematically illustrates, by a side view, a vertical margin to be observed to be able to consider a trajectory flyable.
Figure 8:
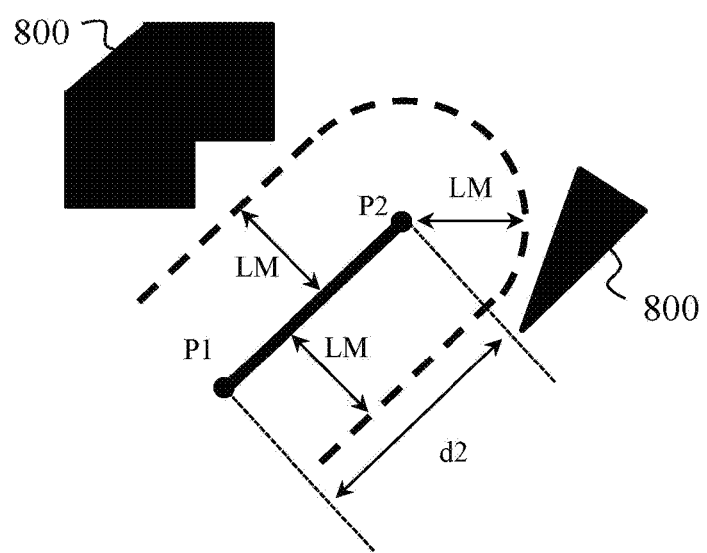
FIG. 8 schematically illustrates, by a top view, a lateral margin to be observed to be able to consider a trajectory flyable.

In fact, a lateral margin LM must be observed laterally in the calculation of trajectory with respect to the obstacles to be avoided, as illustrated in FIG. 8 in which, over a distance d2 from a point P1 to a point P2, the lateral margin LM is free of any obstacle 800. The lateral margin LM can be predetermined or variable as a function of the altitude, of the mode of flight of the aircraft 100 or of the geographic zone for example. Moreover, a vertical margin VM must also be observed vertically in the calculation trajectory with respect to the obstacles to be avoided, as illustrated in FIG. 7 in which, over the distance d2 from the point P1 to the point P2, the vertical margin VM is free of any obstacle 800. The vertical margin VM and the lateral margin LM are predefined values which make it possible to ensure instrumental navigational dependability, that is to say ensure a safe and flyable trajectory.

In a step 401, as already described, the ATG system 101 obtains obstacle information in the form of polygons by altitude strata.

In a step 402, the ATG system 101 expands the polygons. In other words, the ATG system 101 enlarges the polygons in all the directions (in the layer considered). In each direction, the lateral margin LM is added.

Figure 5A:
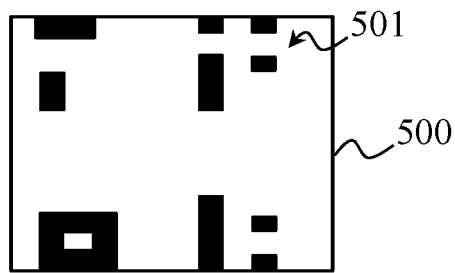
FIG. 5A schematically illustrates an example of terrain elevation polygons to be simplified.
Figure 5B:
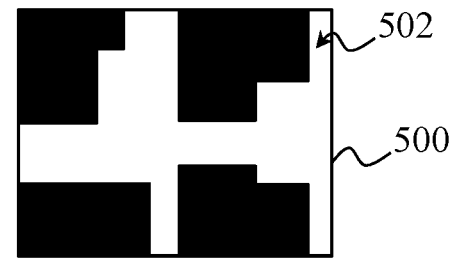
FIG. 5B continues the example of FIG. 5A after an expansion operation.

Then, in a step 403, for each layer, the ATG system 101 merges the polygons which touch or overlap (by altitude layer). As an example, FIG. 5B schematically shows a set of polygons 502 in a predetermined zone 500, which results from the expansion and the merging of a set of polygons 501 schematically illustrated in FIG. 5A.

Figure 5C:
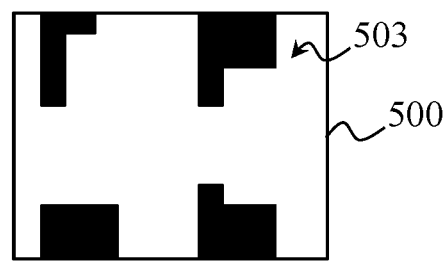
FIG. 5C continues the examples of FIGS. 5A and 5B after a retraction operation.

And, in a step 404, the ATG system 101 retracts the polygons, after any mergings, by the same proportion as in the step 402. As an example, FIG. 5C schematically shows a set of polygons 503, which results from the retraction of the set of polygons 502 schematically illustrated in FIG. 5B.

Thus, the quantity of polygons to be manipulated is reduced, without in any way abandoning trajectories which would be flyable. The steps 402, 403 and 404 thus make it possible to simplify the representation of the terrain around the aircraft 100, by keeping only the obstacles between which the aircraft 100 can navigate. The ATG system 101 avoids studying obstacle bypass trajectories which would not make it possible to observe the protection corridor.

Figure 6A:
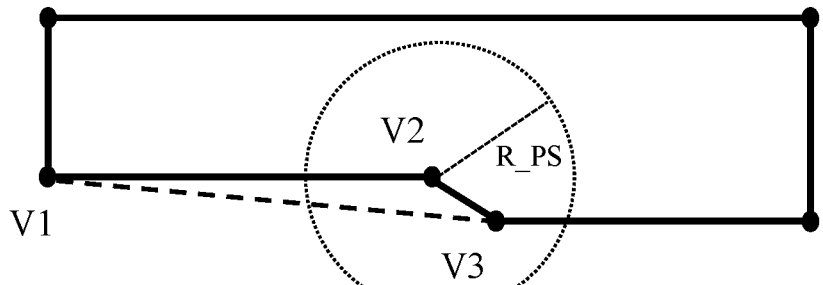
FIG. 6A schematically illustrates an example of a terrain elevation polygon, the edges of which are simplified.
Figure 6B:
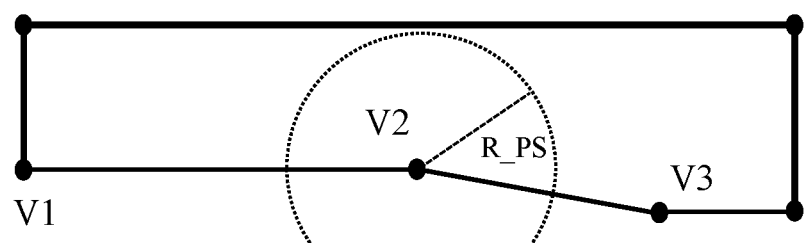
FIG. 6B schematically illustrates an example of a form of terrain elevation polygon, the edges of which are not simplified.

In a step 405, the ATG system 101 seeks to simplify the edges of the polygons. According to one configuration, the ATG system 101 identifies all the vertices of polygons which are located in a concave part of the polygon. The ATG system 101 determines, for each of them, whether at least one of its two neighboring vertices is located at a distance less than a simplification threshold (circle of radius R_PS in FIGS. 6A and 6B). If such is the case, the ATG system 101 eliminates the concavity and directly links the two neighboring vertices; otherwise, the ATG system 101 retains the form of the polygon. FIG. 6A schematically illustrates a polygon in which a vertex V2 is in a concavity between a vertex V1 and a vertex V3. The vertex V3 is at a distance from the vertex V2 less than the simplification threshold R_PS. In this case, the ATG system 101 eliminates the edges which link the vertex V1 to the vertex V2 and the vertex V2 to the vertex V3, and creates instead an edge which directly links the vertex V1 to the vertex V2. The vertex V2 then disappears. FIG. 6B schematically illustrates a polygon in which the vertex V3 is at a distance from the vertex V2 greater than the simplification threshold R_PS. Here, the vertex V2 is retained. Obviously, the invention is not limited to this configuration of simplification of the edges of the polygons. The configuration presented here is a concrete example for the case of vertices of polygons which are located in a concave part of the polygon and according to a criterion of distance to the neighbors.

Thus, the polygons to be manipulated are of simpler forms, and have fewer vertices, which reduces the quantity of candidate trajectories to be studied. This simplification of the polygon edges is optional and can be performed independently of the expansion-merging-retraction operations.

In order to be able to provide a flyable trajectory which is easy to follow to the navigation instruments, the ATG system 101 constructs candidate trajectories composed only of line segments and of circular arcs with a radius that conforms to the performance levels of the aircraft 100 as retrieved in the PDB database 203.

Figure 9:
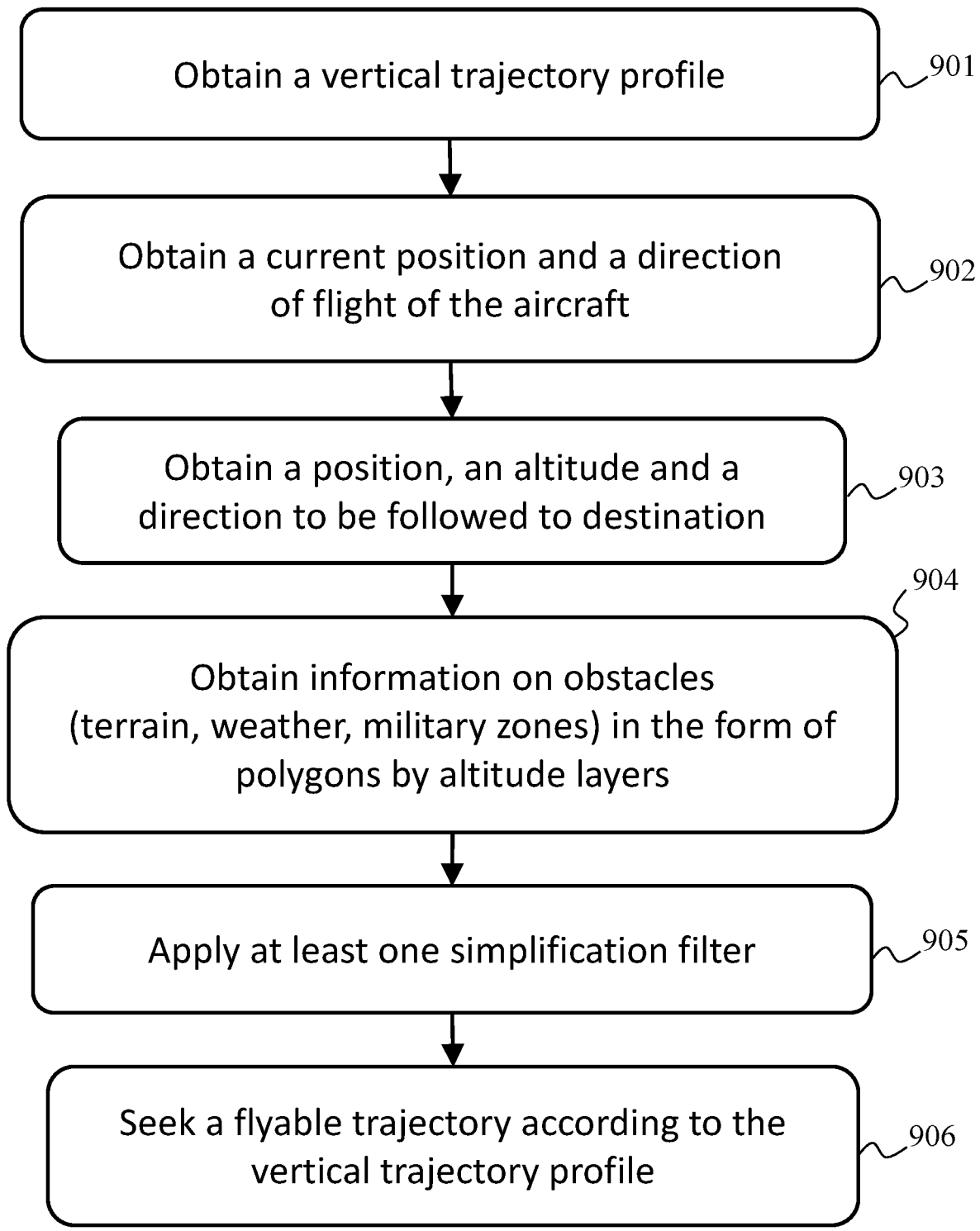
FIG. 9 schematically illustrates an algorithm preparatory to a lateral trajectory search.

FIG. 9 schematically illustrates a preparatory logarithm to a lateral trajectory search.

Figure 10A:
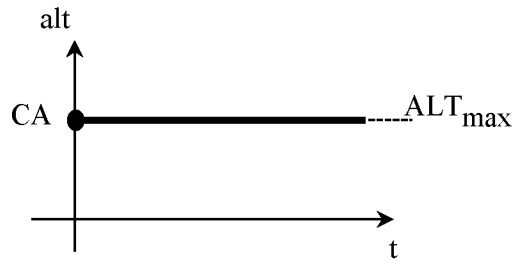
FIG. 10A schematically illustrates a first example of a vertical trajectory profile.
Figure 10B:
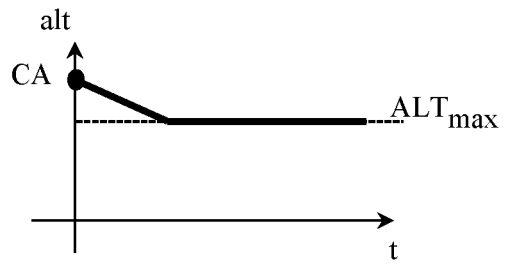
FIG. 10B schematically illustrates a second example of vertical trajectory profile.
Figure 10C:
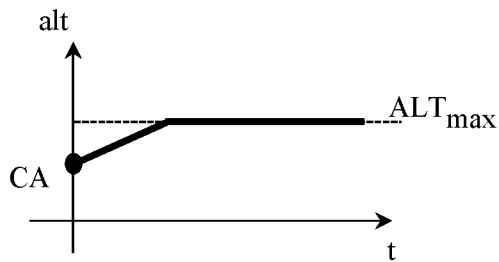
FIG. 10C schematically illustrates a third example of vertical trajectory profile.
Figure 10D:
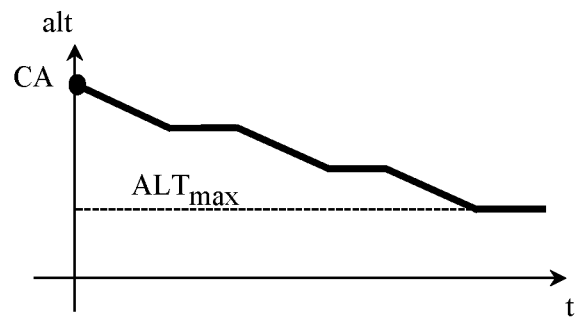
FIG. 10D schematically illustrates a fourth example of vertical trajectory profile.
Figure 10E:
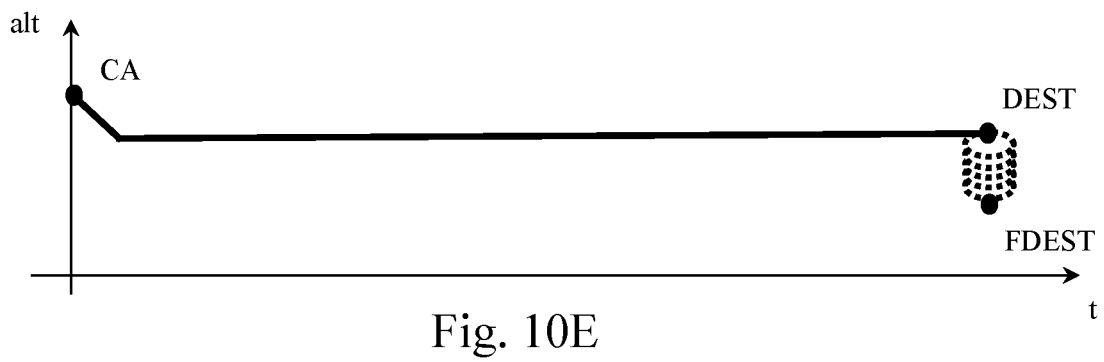
FIG. 10E schematically illustrates a fifth example of vertical trajectory profile.

In a step 901, the ATG system 101 obtains a vertical trajectory profile. The vertical trajectory profile to be observed is preestablished. The vertical trajectory profile defines the altitude variations expected by the aircraft 100. For example, if a cabin depressurization is in progress, the ATG system 101 must take account of a descent by levels in order to bring the aircraft 100 to a maximum altitude ALTmax defined in light of the operational state of the aircraft 100. FIG. 10A schematically illustrates a first example of vertical trajectory profile. In this example, no change of altitude is made and the current altitude CA of the aircraft 100 is maintained, for example at the maximum altitude value ALTmax. If the current altitude CA of the aircraft 100 is greater than the maximum altitude ALTmax defined in light of the operational state of the aircraft 100, the vertical trajectory profile descends to bring the aircraft 100 to fly at the maximum altitude ALTmax allowed, as illustrated schematically in FIG. 10B. If the current altitude CA of the aircraft 100 is less than the maximum altitude ALTmax allowed, the vertical trajectory profile can climb to bring the aircraft 100 to fly at the maximum altitude ALTmax and face a less restrictive environment (terrain relief in particular), as illustrated schematically in FIG. 10C. In the case where the maximum altitude ALTmax is less than the current altitude CA of the aircraft 100 because of a cabin depressurization, the vertical trajectory profile incorporates cabin depressurization procedures and observes a descent by levels, as illustrated schematically in FIG. 10D. As illustrated in FIG. 10E, the vertical trajectory profile can take account of a quantity of iterations of a holding circuit pattern (see in dotted lines in FIG. 10E) between the destination (denoted DEST) for which a lateral trajectory is to be found and the final destination (denoted FDEST) which is located below. In another embodiment, the vertical trajectory profile can incorporate a descent trajectory.

In a step 902, the ATG system 101 obtains the current position A_POS of the aircraft 100, the direction of flight A_DIR of the aircraft 100, and the current speed A_VEL of the aircraft 100. The current speed A_VEL of the aircraft 100 makes it possible to determine the radius of the first turn.

In a step 903, the ATG system 101 obtains the position T_POS of the destination DEST, and its altitude and the direction to be followed T_TRK to destination.

In a step 904, the ATG system 101 obtains information on obstacles (terrain, weather, military zones) in the form of polygons by altitude layers. This information in the form of polygons is obtained from the PDTDB 201, PDMDB 202 and PDWDB 204 databases previously mentioned. For example, the ATG system 101 obtains information on obstacles present in a geographic zone of predetermined surface area which includes the current position of the aircraft 100 and the position of the destination. This geographic zone is preferably the smallest possible, so as to obtain the information on obstacles present in a minimal geographic zone including the current position of the aircraft 100 and the position of the destination.

In an optional step 905, the ATG system 101 applies at least one simplification filter of the polygons to be avoided in the trajectory calculation. For example, such a filter is implemented using operations of expansion-merging-retraction of polygons and/or of simplification of the polygon edges already described in relation to FIGS. 4, 5A, 5B, 5C, 6A and 6B. Other simplification filters can be applied, as detailed hereinbelow. Simplification filters can notably be applied as the flyable trajectory search progresses. Preferably, these filterings, which may take significant computation times, are performed on the ground, prior to a flight, during the construction of the PDTDB database 201.

In a step 906, the ATG system 101 searches for a flyable trajectory from the current position A_POS of the aircraft to the position of the destination T_POS, by following the vertical trajectory profile obtained in the step 901, and by therefore avoiding the obstacles represented by the polygons obtained in the step 904. The trajectory search takes account of the current direction A_DIR of flight of the aircraft 100, and of the direction to be followed T_TRK to destination, and of the performance of the aircraft 100 in light of its operational state. A particular embodiment is detailed hereinbelow in relation to FIG. 11.

Figure 11:
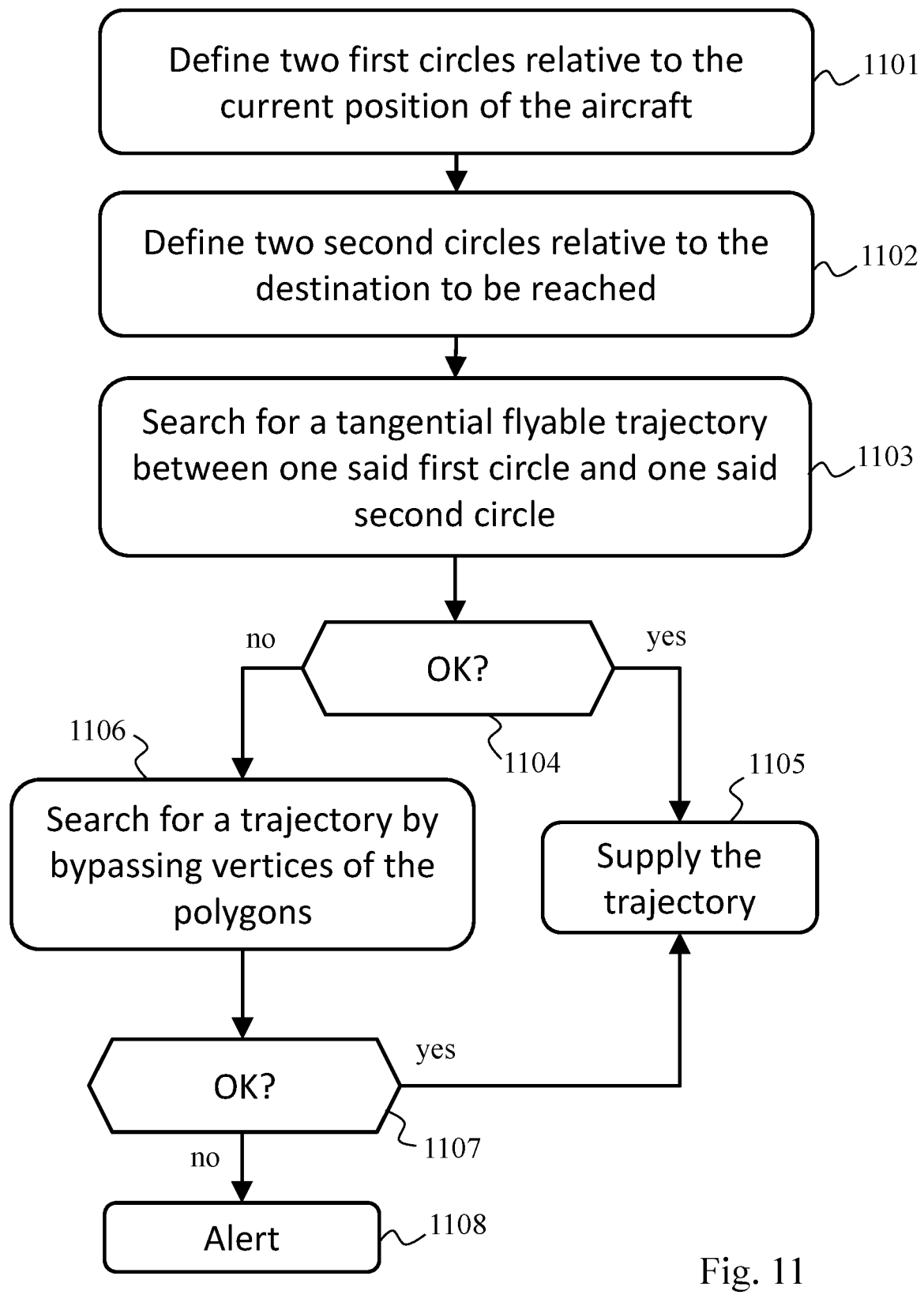
FIG. 11 schematically illustrates a lateral trajectory search algorithm.

FIG. 11 schematically illustrates a lateral trajectory search algorithm.

In a step 1101, the ATG system 101 defines two first circles of predetermined radius dependent on the performance of the aircraft 100, tangential with respect to the current direction A_DIR of flight of the aircraft 100, one being centered on the right, the other being centered on the left, with respect to the current position A_POS of the aircraft 100. The aircraft 100 can turn either to the right, or to the left, with respect to the current direction A_DIR of flight of the aircraft 100. The radius of the first circles is equal to the minimum turn radius that the aircraft 100 can perform in light of its operational state.

In a step 1102, the ATG system 101 defines two second circles of the same predetermined radius dependent on the performance of the aircraft 100, tangential with respect to the direction to be followed T_TRK to destination, one being centered on the right, the other being centered on the left, with respect to the position T_POS of the destination. The direction to be followed T_TRK to destination defines the possible direction of travel of the second circles by the aircraft 100. According to one configuration, the radius of the second circles is equal to the radius of the first circles. According to another configuration, the radius of the second circles is different from the radius of the first circles. The radius of the second circles is calculated from the speed or performance of the aircraft 100 planned on arrival at the second circles. The speed of the aircraft 100 planned on arrival at the second circles is determined from a speed profile which is a function of the altitude of the aircraft 100. In fact, the altitude at which the aircraft 100 arrives at the second circles is determined by using the distance between the aircraft 100 and these second circles as input for the vertical trajectory profile, and as a function of the distance travelled by the aircraft 100. In other words, knowing the distance between the aircraft 100 and the second circles, the speed of the aircraft 100 on arrival at the second circles, which depends on the altitude, is determined on the basis of the vertical trajectory profile as a function of the distance travelled. By having the speed of the aircraft 100, the ATG system 101 can deduce the radius of the second circles.

In a step 1103, the ATG system 101 searches for a tangential flyable trajectory between one first circle defined in the step 1101 and one second circle defined in the step 1102, by observing the current direction A_DIR of flight of the aircraft 100 and the direction to be followed T_TRK to destination. This trajectory search has been performed by observing the vertical trajectory profile obtained in the step 901. In considering that there is no obstacle between the current position A_POS of the aircraft 100 and the position T_POS of the destination, the possible trajectories are schematically illustrated in FIGS. 12A to 12D.

In FIG. 12A, the trajectory is such that the aircraft 100 performs a turn to the left from the position A_POS, follows the first circle centered on the left with respect to the position A_POS, then follows a tangent to the second circle centered on the left with respect to the position T_POS and performs a turn to the left by following the second circle to the position T_POS of the destination. In FIG. 12B, the trajectory is such that the aircraft 100 performs a turn to the left from the position A_POS, follows the first circle centered on the left with respect to the position A_POS, then follows a tangent to the second circle centered on the right with respect to the position T_POS and performs a turn to the right by following the second circle to the position T_POS of the destination. In FIG. 12C, the trajectory is such that the aircraft 100 performs a turn to the right from the position A_POS, follows the first circle centered on the right with respect to the position A_POS, then follows a tangent to the second circle centered on the left with respect to the position T_POS and performs a turn to the left by following the second circle to the position T_POS of the destination. In FIG. 12D, the trajectory is such that the aircraft 100 performs a turn to the right from the position A_POS, follows the first circle centered on the right with respect to the position A_POS, then follows a tangent to the second circle centered on the right with respect to the position T_POS and performs a turn to the right by following the second circle to the position T_POS of the destination.

It should be noted that it is still possible to allow the aircraft 100 to perform a turn to the left as much as a turn to the right at the start of the trajectory search. If the aircraft 100 is currently turning to the right, and it is desirable for the aircraft 100 to then make a turn to the left, a margin is introduced to allow a trajectory search with a turn to the left. An expansion beginning with a turn of the aircraft 100 which does not accord with the arrival at the vertex of the polygon is not however possible.

In a step 1104, the ATG system 101 checks whether one or more flyable trajectories can be found in the step 1103. If such is the case, a step 1105 is performed; otherwise, a step 1106 is performed.

In the step 1105, the ATG system 101 supplies a trajectory, as found in the step 1103, which makes it possible to have the aircraft 100 transit according to the vertical trajectory profile to be observed, from its current geographic position in flight A_POS to the position of the destination T_POS. If several flyable trajectories have been found, the ATG system 101 selects one of them by applying at least one predetermined criterion. Typically, the ATG system 101 selects the shortest trajectory. The algorithm of FIG. 11 is then ended.

In the step 1106, the ATG system 101 performs a search for a flyable trajectory, from its current geographic position in flight A_POS to the position of the destination T_POS, by bypassing polygon vertices. This aspect is detailed hereinbelow in relation to FIGS. 13A and 13B.

In a step 1107, the ATG system 101 checks whether a flyable trajectory by bypassing vertices of the polygons has been found in the step 1106. If such is the case, the step 1105 is performed; otherwise, the step 1108 is performed.

In the step 1108, the ATG system 101 warns that no lateral trajectory has been able to be found to meet the destination in given conditions. The ATG system 101 cannot find flyable trajectories to make it possible to meet, from the current position and according to the attitude of the aircraft 100, the position of the destination T_POS while observing the direction to be followed T_TRK to destination in light of the obstacles that are present. Another destination must then be selected and/or another direction to be followed to destination and/or another vertical trajectory profile. Considering for example that a trajectory computation system of the avionics has access to a database comprising an order list of possible destinations (e.g., airports), in order, for example, to divert the aircraft 100 in an emergency following a cabin depressurization, the trajectory computation system submits to the ATG system 101 the destinations according to the ordered list. If the ATG system 101 is capable of finding a flyable trajectory to the destination submitted by the trajectory computation system, then the trajectory is programmed in the trajectory computation system and is followed to have the aircraft 100 transit to that destination. Otherwise, the trajectory computation system submits to the ATG system 101 the next destination in the ordered list.

Figure 13A:
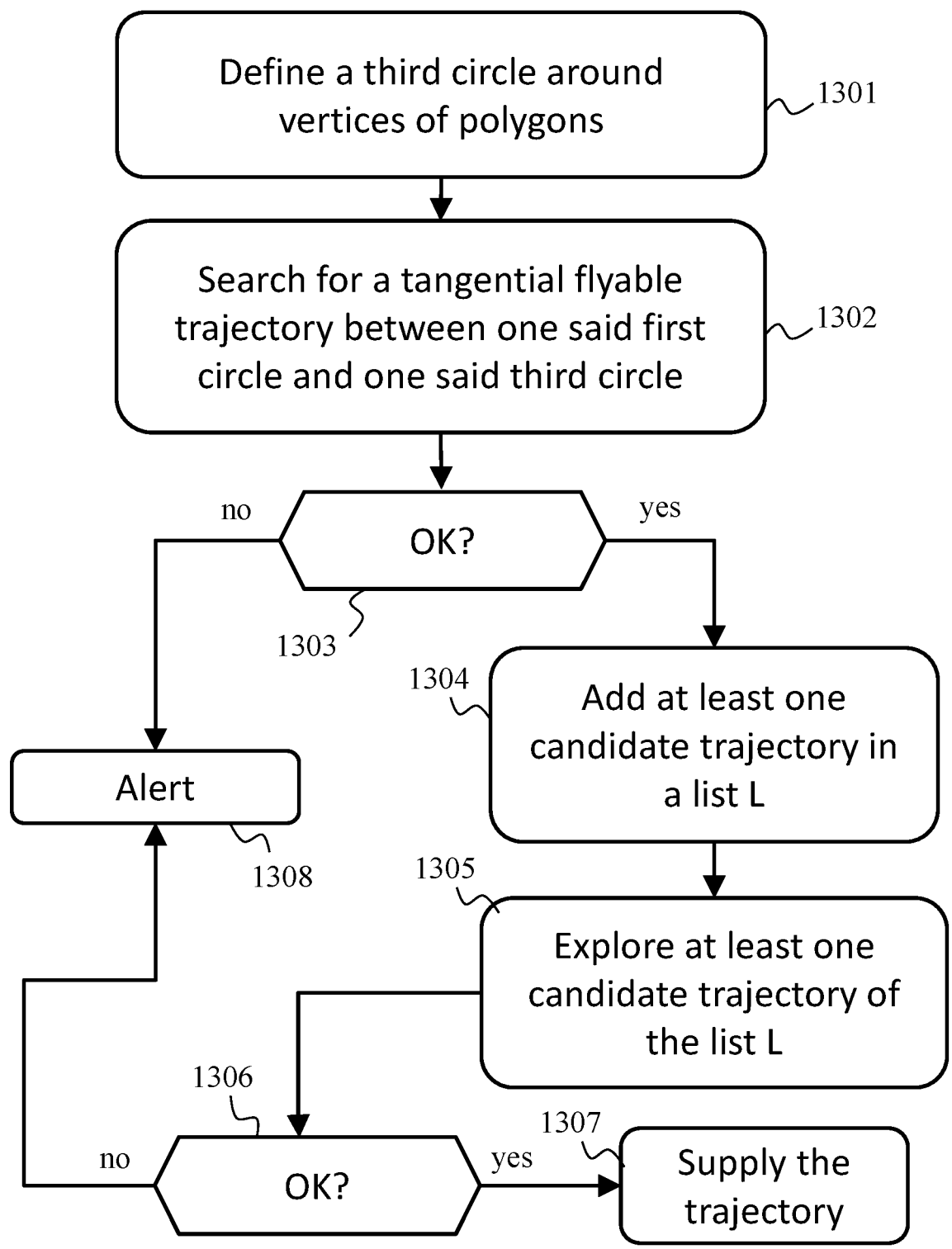
FIG. 13A schematically illustrates a search start algorithm based on bypassing polygon vertices.

FIG. 13A schematically illustrates a search start algorithm based on bypassing polygon vertices.

In a step 1301, the ATG system 101 defines a third circle around the vertices of the polygons representative of obstacles as obtained in the step 904. A filtering can be applied by the ATG system 101 so as not to consider all the vertices of polygons representative of obstacles brought to the knowledge of the ATG system 101 by the PDTDB 201, PDMDB 202 and PDWDB 204 databases. This third circle has a radius which is the maximum between the abovementioned lateral margin LM (defining the protection corridor) and the minimum turn radius that the aircraft 100 is capable of in light of its performance as defined in the PDB database 203, and notably its speed on arrival at the vertex of the polygon. In particular, the radius of the third circle on arrival at the vertex of the polygon is at least equal to the lateral margin LM. The radius of the third circle on leaving the vertex of the polygon, upon the next expansion, is equal to the maximum between the lateral margin LM and the minimum turn radius that the aircraft 100 is capable of. The radius of each third circle is thus calculated as a function of the speed of arrival of the aircraft 100 at that turn. The radius of the third circle on arrival at the vertex of the polygon can be different from the radius of the third circle on leaving the vertex of the polygon. Each third circle thus has a radius which is specific to it, and the third circle used for an expansion is therefore different from the third circle used for a targeted polygon vertex.

In a step 1302, the ATG system 101 searches for a tangential flyable trajectory between one first circle defined in the step 1101 and one third circle defined in the step 1301, by observing the current direction A_DIR of flight of the aircraft 100 and the applicable vertical trajectory profile. As previously, it is possible to search for a flyable trajectory from a turn to the right, or from a turn to the left. One flyable trajectory must make it possible to bypass the vertex of polygons concerned given the direction of arrival of the aircraft 100 on the polygon vertex (which therefore defines the direction in which the third circle is travelled). An example is schematically illustrated in FIG. 14A.

Figure 14A:
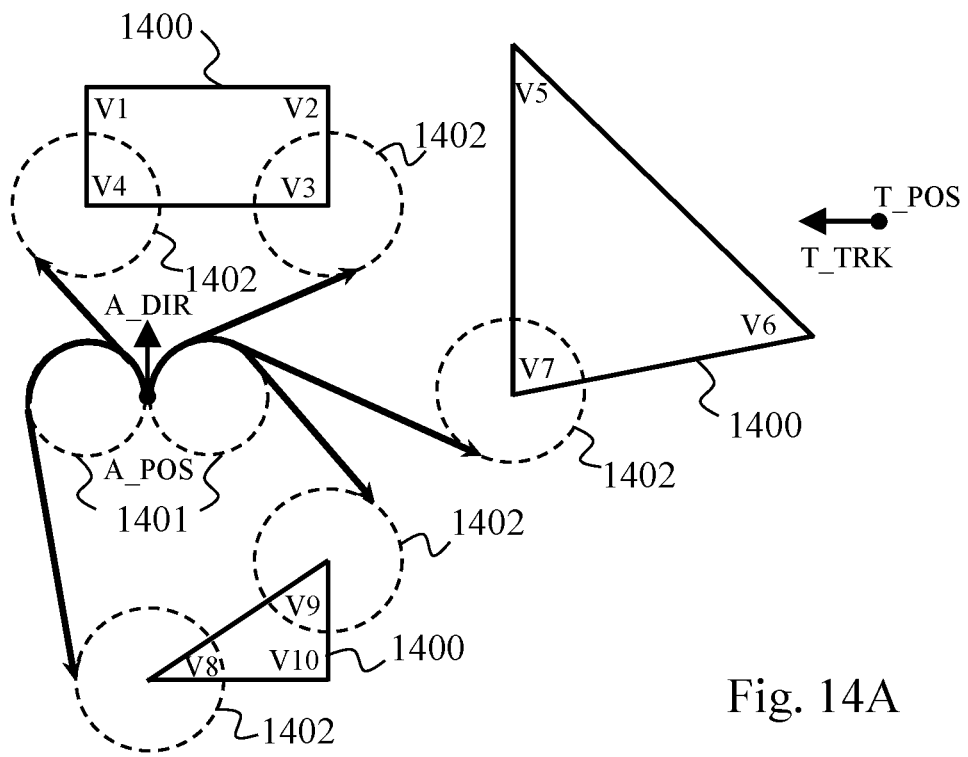
FIG. 14A schematically illustrates a first example of trajectory extension by bypassing polygon vertices.

In FIG. 14A, three obstacles 1400 are represented purely by illustration. No flyable direct trajectory between the position A_POS and the position T_POS, also observing the directions A_DIR and T_TRK, exists. A bypassing of one or more obstacles is therefore necessary. FIG. 14A shows the first circles 1401 defined in the step 1101. Also shown therein are the third circles 1402 for a certain number of vertices V3, V4, V7, V8 and V9. These are the polygon vertices for which at least one tangential flyable trajectory has been found, as illustrated by the thick arrowed lines in FIG. 14A (certain possible tangential flyable trajectories are not represented in the interests of drawing clarity). These trajectories must be explored further to find a path leading to the position of the destination T_POS. For the vertices V1, V2, V5, V6 and V10, no tangential flyable trajectory exists (because of the obstacles present and of the observance of the lateral margin LM (notably with respect to the vertex V5)).

In a step 1303, the ATG system 101 checks whether one or more flyable trajectories have been found in the step 1302. If such is the case, a step 1304 is performed; otherwise, a step 1308 is performed.

In the step 1304, the ATG system 101 adds each trajectory found in the step 1302 to a list L. And, in the step 1305, the ATG system 101 explores at least one candidate trajectory of the list L, as detailed hereinbelow in relation to FIG. 13B. Next, in a step 1306, the ATG system 101 checks whether one or more flyable trajectories have been found in step 1305. If such is the case, a step 1307 is performed; otherwise, the step 1308 is performed.

In the step 1307, the ATG system 101 supplies a trajectory, as found in the step 1305, which makes it possible to have the aircraft 100 transit according to the vertical trajectory profile to be observed, from its current geographic position in flight A_POS to the position of the destination T_POS. If several flyable trajectories have been found, the ATG system 101 selects one of them by applying at least one predetermined criterion. Typically, the ATG system 101 selects the shortest trajectory. The step 1307 is identical to the step 1105. The algorithm of FIG. 11 is then ended.

In the step 1308, the ATG system 101 alerts that no lateral trajectory has been able to be found to meet the destination in the given conditions. The step 1306 is identical to the step 1108.

Figure 13B:
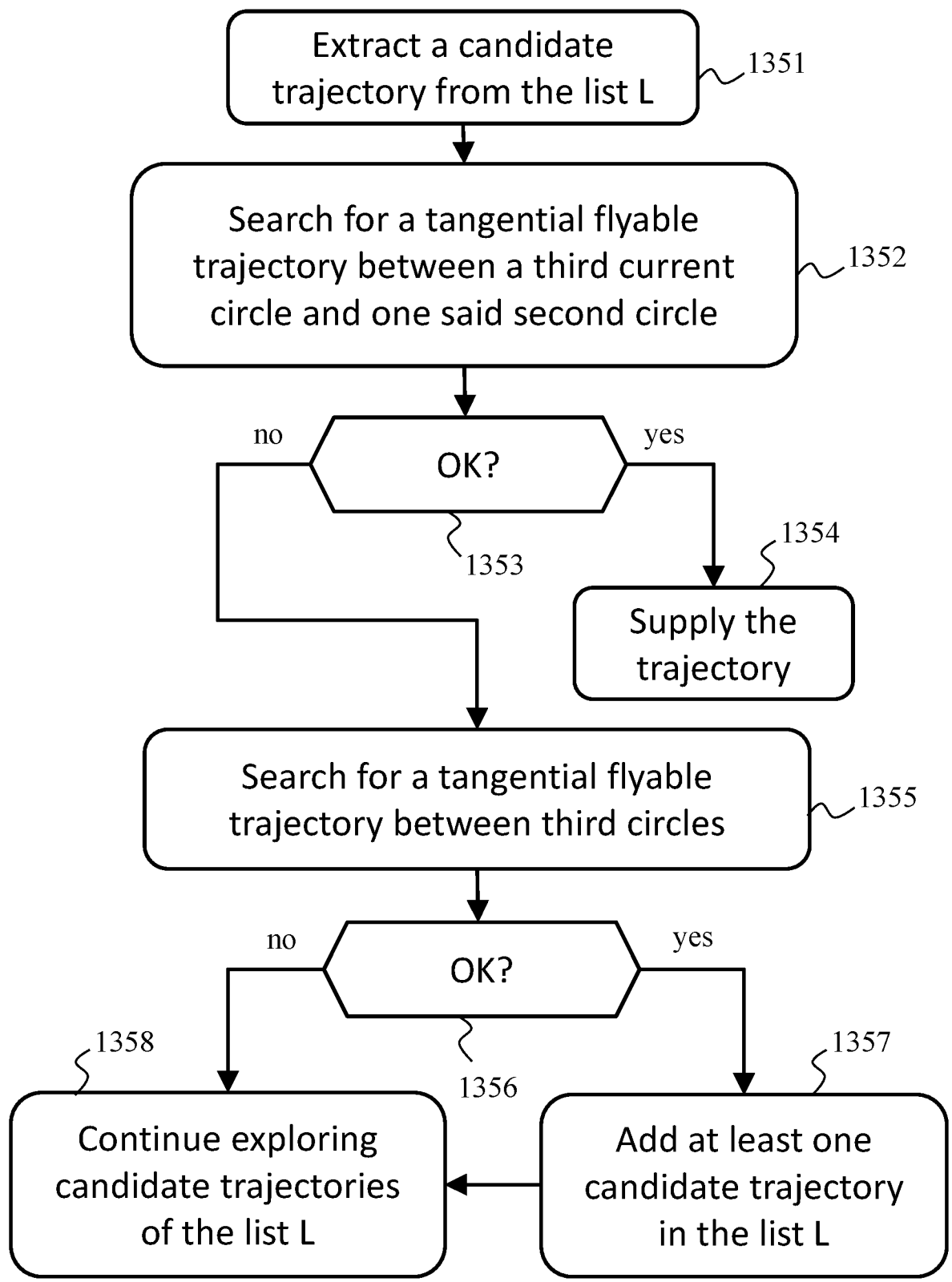
FIG. 13B schematically illustrates an iterative search continuation algorithm based on bypassing polygon vertices.

FIG. 13B schematically illustrates an iterative search continuation algorithm based on bypassing of polygon vertices (detail of the step 1305 of FIG. 13A).

In a step 1351, the ATG system 101 extracts a candidate trajectory from the list L.

In a particular embodiment, the ATG system 101 chooses, in the list L, the most promising candidate trajectory in light of a path search heuristic. For example, a heuristic H of the algorithm A* or one of its variants, such as, for example, the so-called "any-time A*" algorithm, is used. The ATG system 101 then associates, with each trajectory in the list L, the cost function F such that:

$$F=G+H$$

in which G is the distance travelled to the current end of the trajectory considered and H is the heuristic, which underestimates the distance still to be travelled (H=0 for a flyable trajectory which end on the destination). The ATG system 101 then extracts from the list L the candidate trajectory which minimizes the cost function F.

In a step 1352, the ATG system 101 searches for a tangential flyable trajectory between the third circle (starting circle of an expansion, the radius of which is equal to the maximum between the lateral margin LM and the turn radius that the aircraft 100 can perform, this radius being calculated from the current speed of the aircraft 100 and by knowing the altitude of the aircraft 100) on which the candidate trajectory stops and one second circle defined in step 1102, by observing the direction T_TRK to be followed on arrival and the applicable vertical trajectory profile. The ATG system 101 thus searches to see if all the obstacles have been bypassed and whether a directly flyable trajectory to the destination exists (last branch ("leg") of a trajectory). This would for example be the case from the third circle which surrounds the vertex V5 in FIG. 14A, but not from the vertex V3.

In a step 1353, the ATG system 101 checks whether one or more flyable trajectories have been found in the step 1352. If such is the case, a step 1354 is performed; otherwise, a step 1355 is performed.

In the step 1354, the ATG system 101 supplies a trajectory, as found in the step 1352, which makes it possible to have the aircraft 100 transit according to the vertical trajectory profile to be observed, from its current geographic position in flight A_POS to the position of the destination T_POS. If several flyable trajectories have been found, the ATG system 101 selects one of them by applying at least one predetermined criterion. Typically, the ATG system 101 selects the shortest trajectory. The step 1354 is identical to the steps 1307 and 1105. The algorithm of FIG. 11 is then ended. In a particular embodiment, the ATG system 101 checks to see if there is a flyable trajectory that is more appropriate in light of the predetermined criterion or criteria. In this case, the ATG system 101 continues exploring candidate trajectories of the list L (to find candidates in the list L with a lower cost function F value). When a flyable trajectory is found, such trajectory is added to the list of candidates L, with a heuristic H equal to 0 and a cost function F equal to the distance to the end of the trajectory which has just been found. The ATG system 101 determines that the flyable trajectory search is ended when the next candidate trajectory in the list L (at the start of the list L) has a heuristic H equal to 0.

Figure 14B:
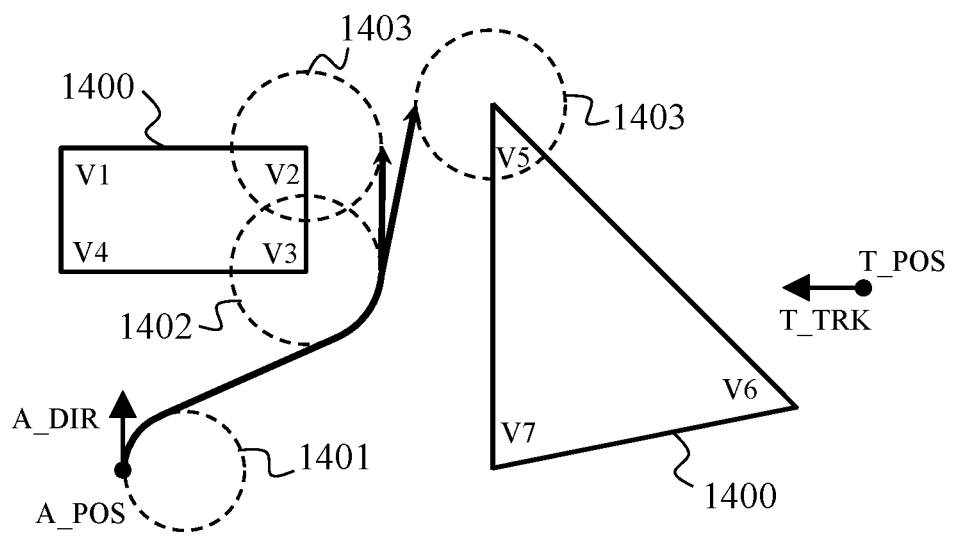
FIG. 14B schematically illustrates a second example of trajectory extension by bypassing polygon vertices.
Figure 14B:
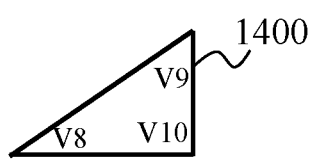

In the step 1355, the ATG system 101 searches for a tangential flyable trajectory between the first circle on which the candidate trajectory stops and another third circle. In other words, the ATG system 101 searches for another vertex to be bypassed which could approach the position of the destination T_POS, by observing the applicable vertical trajectory profile (and preferably the applicable speed profile). The direction in which the third circle on which the candidate trajectory stops is travelled depends on the direction of arrival of the aircraft 100 on the third circle. A filtering can be applied by the ATG system 101 so as not to consider all the vertices of polygons representative of obstacles brought to the knowledge of the ATG system 101 by the PDTDB 201, PDMDB 202 and PDWDB 204 databases. An example is schematically illustrated in FIG. 14B, which schematically illustrates a trajectory search progression based on bypassing of polygon vertices, by following the following path: travelling a part of the first circle 1401 centered on the right with respect to the position A_POS, then travelling a tangent between the first circle 1401 and the third circle 1402 around the polygon vertex V3, then travelling a part of the third circle 1402 around the polygon vertex V3, then travelling a tangent between the third circle 1402 around the polygon vertex V3 and the third circle 1403 around the vertex V5, or travelling a tangent between the third circle 1402 around the polygon vertex V3 and the third circle 1403 around the polygon vertex V2. It appears in FIG. 14B that, from this third circle 1403 around the vertex V5, the position T_POS of the destination can be directly reached, while observing the direction T_TRK to be followed to destination. A possible trajectory should therefore be found on the next iteration of exploration of this trajectory.

It should be noted that when the travelling of the third circle on which the candidate trajectory stops is done by turning to the left (respectively to the right), the ATG system 101 excludes any flyable trajectory to another third circle which imposes a turn to the right (respectively to the left). In fact, such a flyable trajectory can exist, but is not considered interesting. There are in this case no flyable tangential trajectories which observe the direction of travel of the third circle on which the candidate trajectory stops. Furthermore, shorter alternative trajectories must of course exist, and therefore be present in the list L, towards these polygon vertices. Thus, in FIG. 14B, the ATG system 101 excludes any trajectories which, from the third circle 1402 which surrounds the polygon vertex V3, lead to the vertices V7 and V9 for example.

In a step 1356, the ATG system 101 checks whether one or more flyable trajectories have been found in the step 1355. If such is the case, a step 1357 is performed; otherwise, a step 1358 is performed.

In the step 1357, the ATG system 101 adds each trajectory found in the step 1355 to the list L. Then, the step 1358 is performed.

In a particular embodiment, the ATG system 101 adds one trajectory to the list L only if the list L does not already contain a shorter trajectory that makes it possible to reach the third circle around the polygon vertex at which the trajectory stops. And, in a particular embodiment, when the ATG system 101 adds one trajectory to the list L, the ATG system 101 removes from the list L any trajectory which stops at the third circle of the same polygon vertex but which is longer than the added trajectory.

In the step 1358, the ATG system 101 continues to explore at least one candidate trajectory of the list L, and then performs a new iteration of the algorithm of FIG. 13B.

Figure 15A:
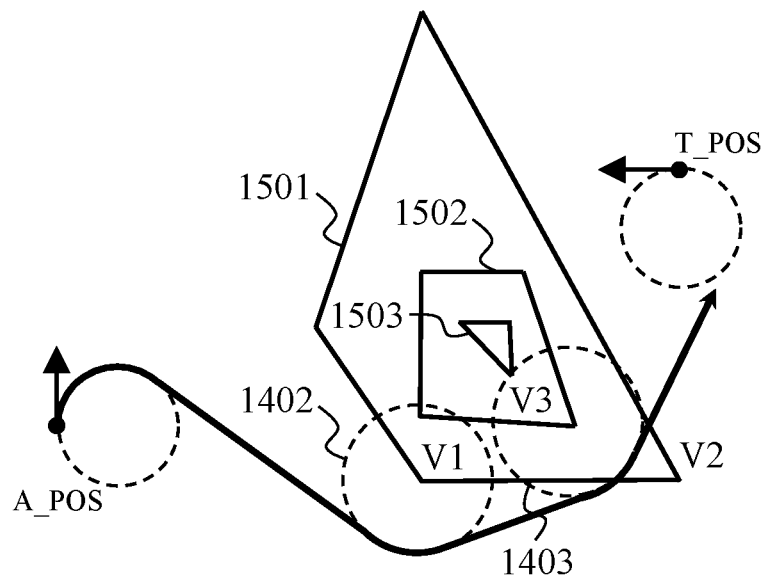
FIG. 15A schematically illustrates a first example of taking account of the vertical trajectory profile.
Figure 15B:
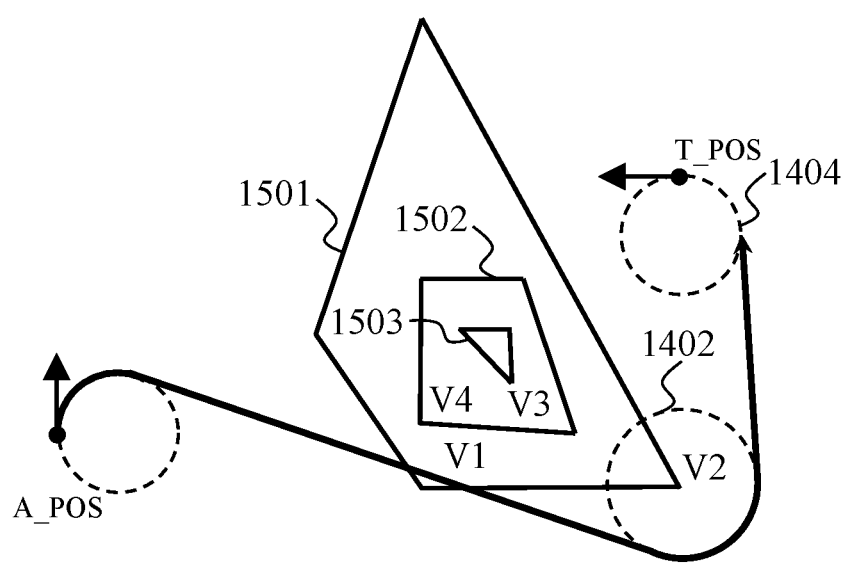
FIG. 15B schematically illustrates a second example of taking account of the vertical trajectory profile.

As already mentioned, the ATG system 101 observes the vertical trajectory profile when determining a trajectory. It should therefore be noted that, if the vertical trajectory profile involves the aircraft 100 gaining altitude, that means that, over time, the trajectory calculation is freed of the constraints of certain layers and therefore of polygons (obstacles). This situation is schematically illustrated in FIG. 15A. A trajectory from the position A_POS of the aircraft 100 to the position of the destination T_POS is investigated, by bypassing an obstacle defined by polygons on 3 successive layers: a first layer representing an altitude interval lower than a second layer, itself representing an altitude interval lower than a third layer. The polygon 1501 representing the obstacle in the first layer includes the polygon 1502 representing the obstacle in the second layer, itself including the polygon 1503 representing the obstacle in the third layer. In light of the vertical trajectory profile, the first polygon vertex in sequence that the aircraft 100 bypasses is the vertex V1 of the first layer. After bypassing this polygon vertex V1, the vertical trajectory profile involves a climbing altitude of the aircraft 100, above the first layer (taking account of the vertical margin VM). Bypassing of the next polygon vertex in sequence thus concerns the vertex V3 of the second layer and not the vertex V2 of the first layer. Conversely, if the vertical trajectory profile means that the aircraft 100 loses altitude, that means that, over time, the trajectory calculation is reinforced by the constraints of certain layers and therefore polygons (obstacles). This situation is schematically illustrated in FIG. 15B. In this case, the first polygon vertex in sequence that the aircraft 100 bypasses is the vertex V2 of the first layer. Starting from the current position A_POS, the altitude of the aircraft 100 is higher than the first layer (taking account of the vertical margin VM). The vertex V1 does not then need to be bypassed. With the aircraft 100 descending in altitude, the constrains of obstacles of the first layer are added. In FIG. 15B, the tangential trajectory with the third circle of the vertex V2 from the first circle centered on the right of the position A_POS according to the direction A_DIR is away from the vertex V4 of the second layer by a distance greater than the lateral margin LM. The vertex V2 must thus be bypassed (and not the vertex V3 of the second layer).

For an example of application in which the radii of the second and third circles remain constant, expansion of trajectory between a vertex VA and a vertex VB (or the destination) remains the same between different calls to the algorithm as long as the turn radius used is the same and the altitude is unchanged by the vertical trajectory profile, the expansion of trajectory between the vertex VA and the vertex VB can be calculated and stored in memory and be reused in a subsequent calculation. That makes it possible to regularly interrogate the ATG system 101 during the flight to ensure that the safe and flyable trajectory is always available to bring the aircraft 100 to destination. Thus, a matrix can store, for each pair of vertices (or vertex and destination), information on the possibility or impossibility of establishing a flyable trajectory between them according to the altitude considered, and if necessary, supply a pointer to a memory zone which describes the flyable trajectory applicable between two vertices. That makes it possible to reduce the trajectory computation times in these subsequent calls to the ATG system 101.

In a particular embodiment, if the ATG system 101 detects, when the vertical trajectory profile demands a descent, that the aircraft 100 is in the polygon of an obstacle (for example a high plane at 10,000 feet), it is desirable for it to leave the obstacle concerned as quickly as possible. For that, the ATG system 101 creates virtual vertices.

As already mentioned, filtering operations can be performed to further reduce the time to calculate the flyable trajectory to meet the destination. These filtering operations are performed in real time, during the trajectory search. These filtering operations make it possible to consider only the potentially interesting trajectories, and to filter out the trajectories that are, a priori, not interesting. The particular filtering embodiments presented hereinbelow can be combined.

Figure 16A:
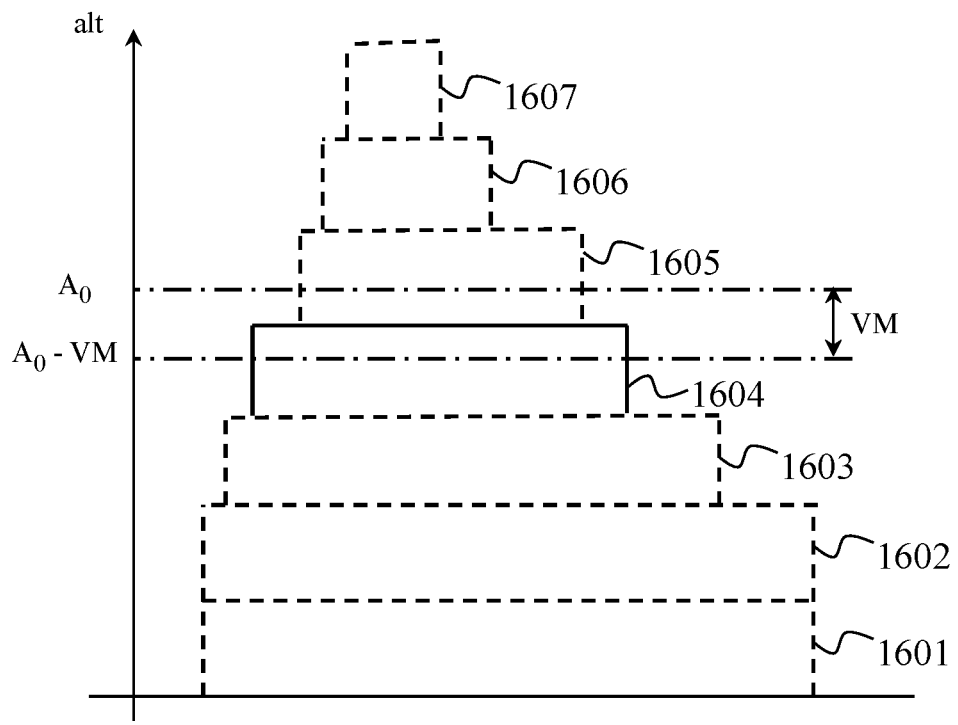
FIG. 16A schematically illustrates, by a cross-sectional view, a set of polygons which represent, by altitude layer, a terrain relief obstacle compared with an aircraft altitude.
Figure 16B:
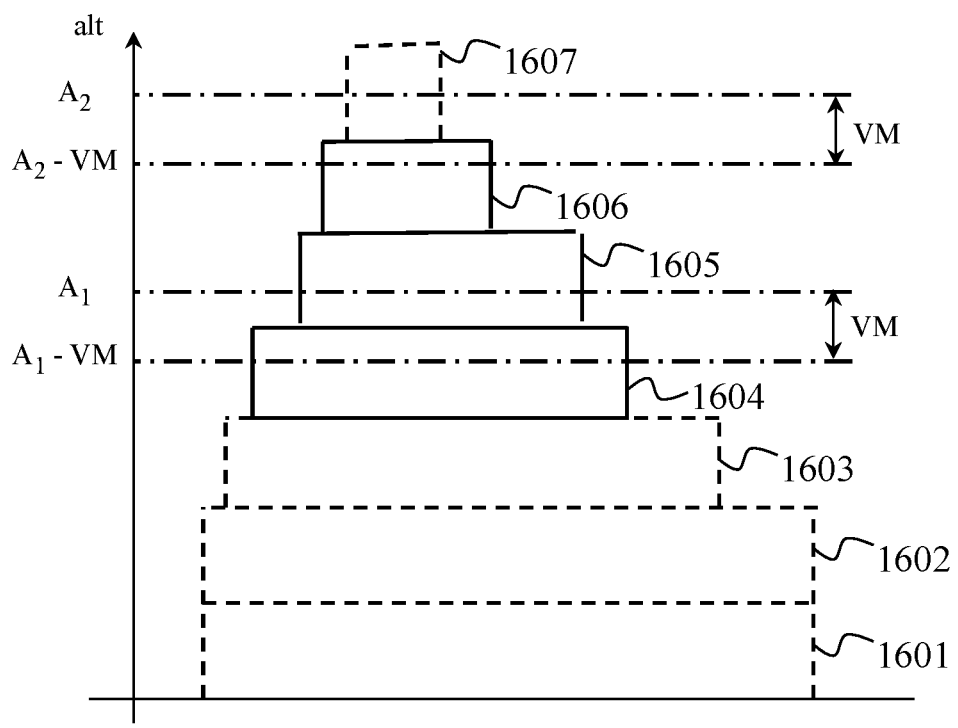
FIG. 16B schematically illustrates, by a cross-sectional view, a set of polygons which represent, by altitude layer, a terrain relief obstacle compared with an aircraft altitude interval.

In a first filtering embodiment, the ATG system 101 performs a trajectory search based on bypassing vertices only by considering the vertices of polygons that are relevant in light of the vertical trajectory profile. Thus, in the case where the trajectory search must be performed at constant altitude, only the lowest layer out of those which are not lower than the altitude of the aircraft 100 minus the vertical margin VM is taken into account, as shown in FIG. 16A. The ATG system 101 then excludes from the trajectory search the polygon vertices which are not in the lower layer. FIG. 16A schematically illustrates, by a cross-sectional view, a set of polygons which represent, by altitude layer, a terrain relief obstacle. The obstacle is represented on 7 layers 1601 to 1607. In assuming that the considered altitude of the aircraft 100 is equal to A0, then only the vertices of polygons of the lowest layer 1604 out of those 1604, 1605, 1606, 1607 which are not lower than the altitude of the aircraft 100 minus the vertical margin VM are taken into account. The polygons of the lower layers 1601, 1602, 1603 are not considered because they are below the altitude A0 minus the vertical margin VM. Since the polygons of the higher layers 1605, 1606, 1607 are included in the polygon of the layer 1604, nor are their vertices considered. Indeed, these polygons of the higher layers 1605, 1606, 1607 are above the altitude A0 minus the vertical margin VM and must therefore be avoided, but are included in the polygon of the layer 1604. By avoiding the polygon of the layer 1604, the polygons of the higher layers 1605, 1606, 1607 are therefore also avoided. In the case of a climb or descent, the same reasoning is applied to keep only the layers which are relevant in light of the altitude interval considered in the vertical trajectory profile, as shown in FIG. 16B. The altitude interval considered is defined by an upper limit equal to the minimum altitude A1 of the aircraft 100 to be considered minus the vertical margin VM, and by an upper limit equal to the maximum altitude A2 of the aircraft 100 to be considered minus the vertical margin VM.

Figure 17:
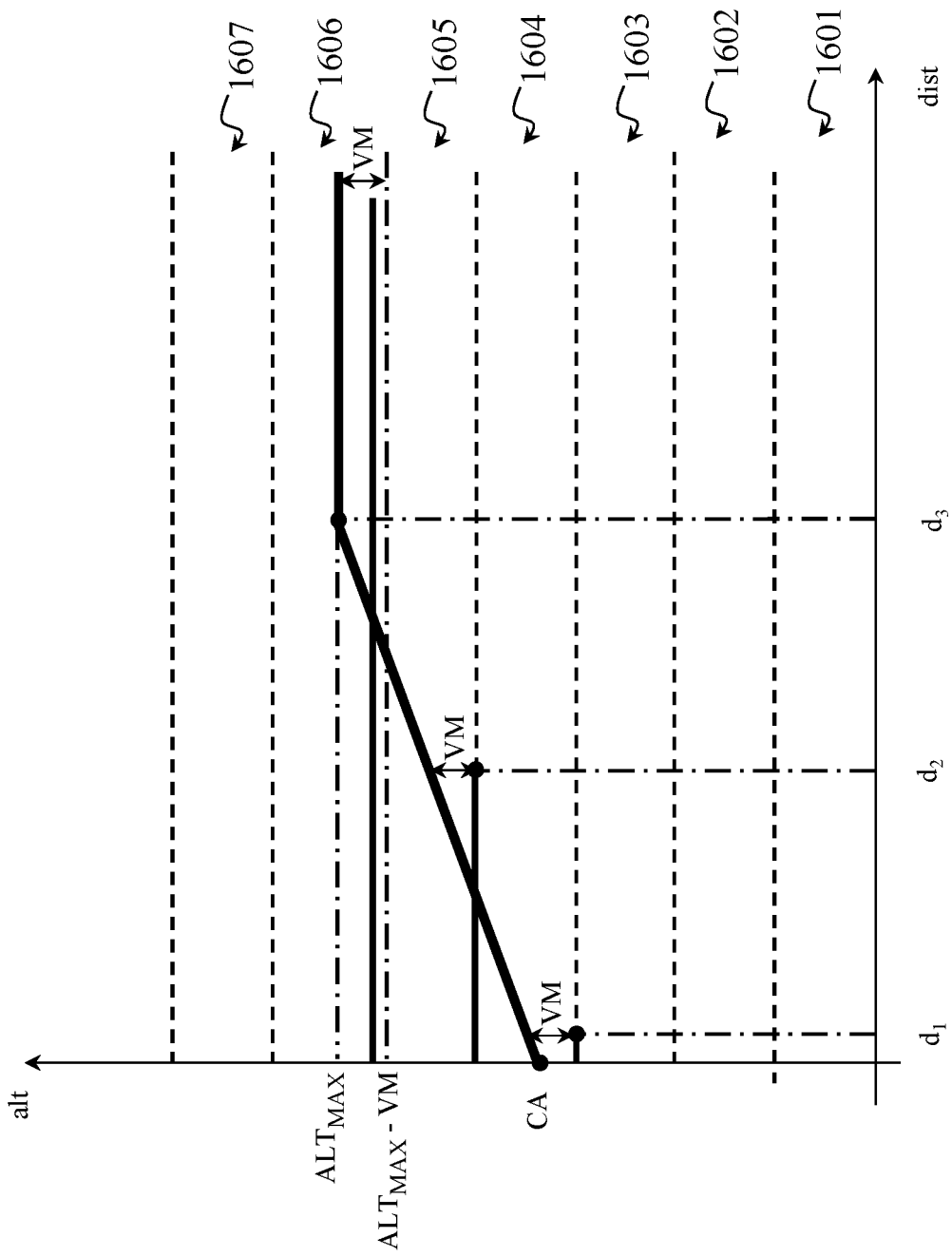
FIG. 17 schematically illustrates a selection of polygons, by altitude layers, as a function of the vertical trajectory profile of FIG. 10C.
Figure 19:
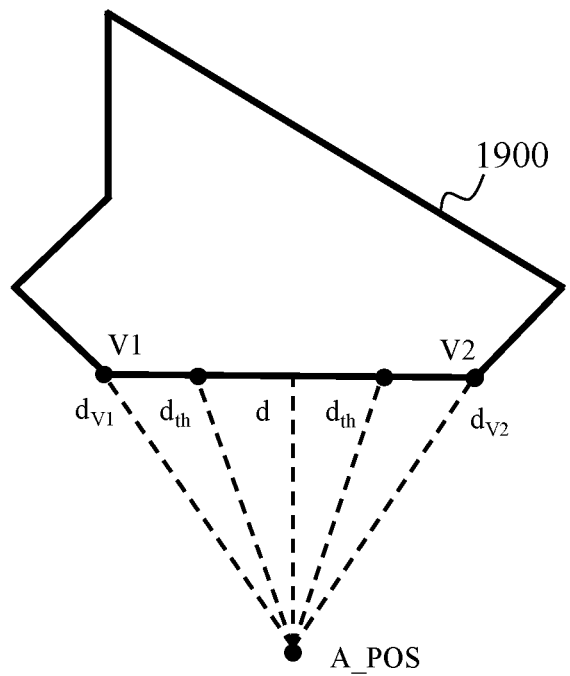
FIG. 19 schematically illustrates a difference between a distance defined relative to polygon vertices and a distance defined relative to the polygon edge linking these vertices.

In a second filtering embodiment, the ATG system 101 takes finer account of the vertical trajectory profile to perform a filtering by distance relative to the edges of polygons. In fact, a polygon edge does not need to be taken into account in a trajectory expansion considered if this polygon edge is far enough away from the aircraft 100 to ensure that, even if the latter goes straight to that edge, the vertical trajectory profile is such that the altitude of the aircraft will be sufficiently augmented at the moment of arrival on the edge for the corresponding relief no longer to be a constraint for the actual trajectory of the aircraft 100. This aspect is shown in FIG. 17, which schematically illustrates a selection of polygons, by altitude layers, as a function of the vertical trajectory profile of FIG. 10C. Thus, according to the vertical trajectory profile, the altitude of the aircraft 100 becomes greater than the upper limit of the layer 1603 plus the vertical margin VM after having travelled a distance d1, the altitude of the aircraft 100 becomes greater than the upper limit of the layer 1604 plus the vertical margin VM after having travelled a distance d2 and the altitude of the aircraft 100 stabilizes at the maximum altitude ALTmax after having travelled a distance d3, the upper limit of the layer 1605 being above the maximum altitude ALTmax minus the vertical margin VM. For a climb of the aircraft 100, the layer 1603 is relevant to the distance d1 minus the lateral margin LM, the layer 1604 is relevant to the distance d2 minus the lateral margin LM, and the layer 1605 is relevant to the distance d3 minus the lateral margin LM and beyond. For a descent of the aircraft, the layer 1603 is relevant to the distance d1 plus the lateral margin LM, the layer 1604 is relevant to the distance d2 plus the lateral margin LM, and the layer 1605 is relevant to the distance d3 plus the lateral margin LM and beyond. The ATG system 101 calculates the distance from each polygon edge as if a straight line segment were followed, which underestimates the real distance to the obstacle because the aircraft 100 does not necessarily follow this direction and one or more turns are generally necessary to allow the aircraft 100 to arrive there in reality. Next, from the vertical trajectory profile corresponding to a climb, the ATG system 101 determines whether, after having travelled the distance to the edge minus the lateral margin LM, the altitude of the aircraft 100 is greater than that of the edge considered plus the vertical margin VM. If such is the case, the edge does not need to be taken into account in the trajectory calculation. Likewise, from the vertical trajectory profile corresponding to a descent, the ATG system 101 determines whether, after having travelled the distance to the edge plus the lateral margin LM, the altitude of the aircraft 100 is less than that of the altitude layer below the considered edge plus the vertical margin LM. If such is the case, the edge does not need to be taken into account in the trajectory calculation. The use of an underestimation of the distance to each edge guarantees that no relevant edge is filtered. It is important here to determine the distance to the edge, not the distance to its vertices. Using the distance to the vertices could result in the filtering of an edge which should be retained. In fact, the distance dv1 (respectively dv2) between the position A_POS of the aircraft 100 (independently of the direction of flight A_DIR) and a vertex V1 (respectively V2) of a polygon 1900 is greater than that between the position A_POS of the aircraft 100 and the edge linking the vertices V1 and V2, as schematically illustrated in FIG. 19, in which dth represents the distance below which the altitude of the aircraft according to the vertical trajectory profile is lower than that of the edge concerned plus the vertical margin VM.

Figure 18:
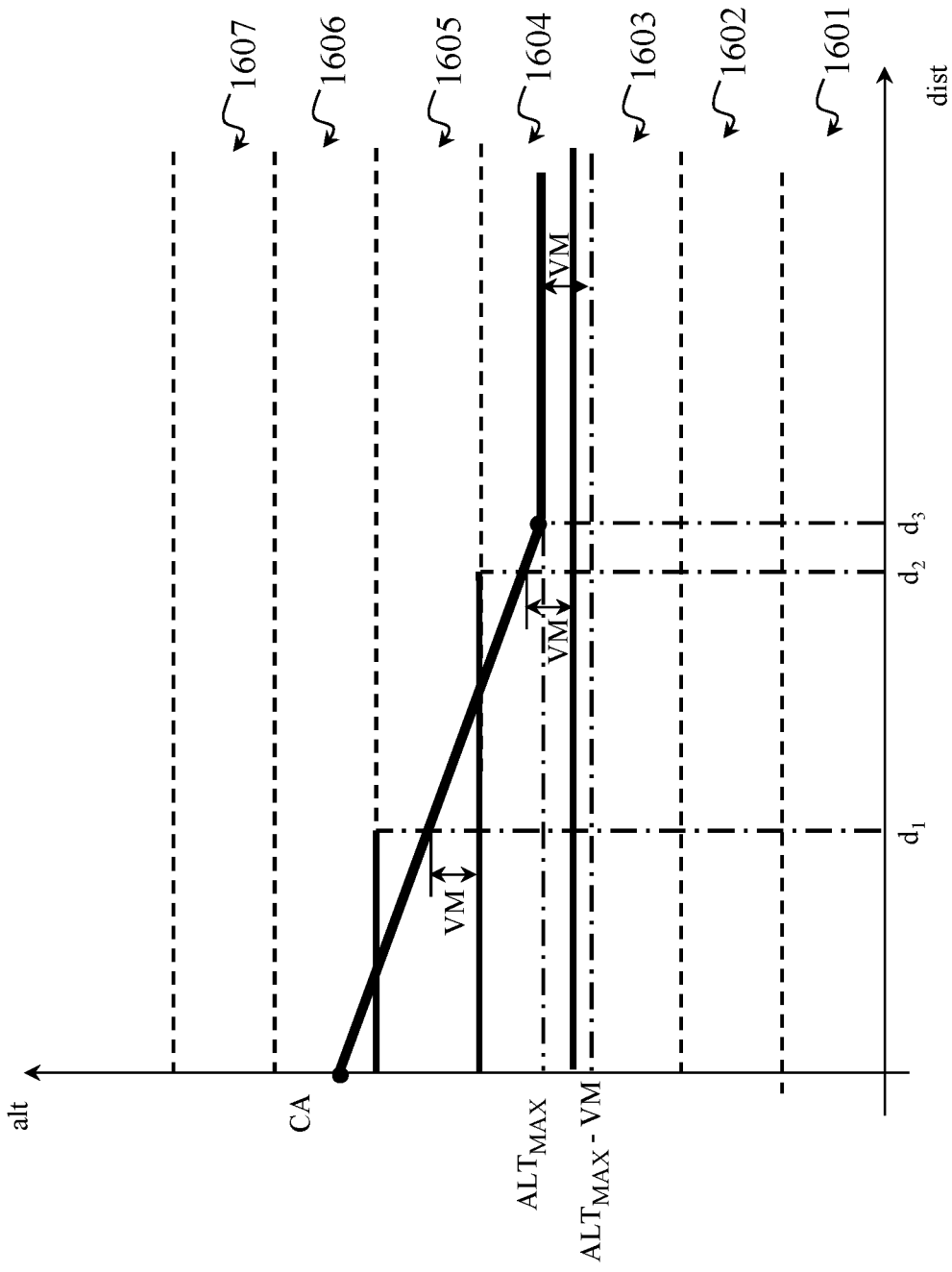
FIG. 18 schematically illustrates a selection of polygons, by altitude layers, as a function of the vertical trajectory profile of FIG. 10B.

An identical principle can be applied with a vertical trajectory profile which imposes a descent of the aircraft 100. This aspect is shown in FIG. 18, which schematically illustrates a selection of polygons, by altitude layers, as a function of the vertical trajectory profile of FIG. 10B. Thus, according to the vertical trajectory profile, the altitude of the aircraft 100 stops being greater than the upper limit of the layer 1604 plus the vertical margin VM after having travelled a distance d1, the altitude of the aircraft 100 stops being greater than the upper limit of the layer 1603 plus the vertical margin VM after having travelled a distance d2 and the altitude of the aircraft 100 stabilizes at the maximum altitude ALTmax after having travelled a distance d3, the upper limit of the layer 1603 being greater than the maximum altitude ALTmax minus the vertical margin VM. Then, the layer 1605 is relevant to the distance d1 plus the lateral margin LM, the layer 1604 is relevant to the distance d2 plus the lateral margin LM, and the layer 1603 is relevant to the distance d3 plus the lateral margin LM and beyond. In the case of a descent of the aircraft 100, if a lower layer becomes relevant and must be avoided (the edges of the polygon are no longer free), a layer above this layer, which is included in this lower layer, is automatically avoided. Such a filtering thus makes it possible to minimize the calculations to be carried out, since it is determined upstream that the lower layer becomes relevant.

In a third filtering embodiment, the ATG system 101 performs a filtering relating to the distance G in the expression of the cost function F. When a first safe path to a polygon vertex is found, a descriptor of this path is saved and serves as reference to filter the list of the candidate trajectories of the list L. This filtering prevents the generation of a trajectory to this same vertex which would be longer, even if this trajectory is flyable. Thus, once the ATG system 101 has found a safe path P1 to a vertex V, its distance value G (denoted Gv) is saved. Next, each time another candidate trajectory P2 also envisages meeting the vertex V (to bypass it) with a current distance value G (denoted Gp), the following condition is tested:

$$Gp + dmin > Gv$$

in which dmin is a lower limit of length of the path between the position at which the trajectory considered stops and the polygon vertex considered. Such a lower limit corresponds to the Euclidean distance between the position at which the trajectory considered stops and the polygon vertex considered (corresponding to a case in which the trajectory of the aircraft is already aligned with the tangent with the third circle of this polygon vertex and it is therefore not necessary to perform a turn to arrive there). If the condition is fulfilled, no expansion of a trajectory is created, and the candidate trajectory that already exists is retained since there is no better path to arrive there. In this case, the list L remains unchanged. Otherwise, a better path is constructed, and the ATG system 101 updates the list L accordingly, that is to say, the path P2 replaces the path P1 to reach the third circle of the polygon vertex V and the distance value G is also updated.

In a fourth filtering embodiment, the ATG system 101 performs a filtering relating to the cost function F. If a flyable trajectory from the position A_POS to the position T_POS which observes the vertical trajectory profile and the directions A_DIR and T_TRK exists in the list L, the ATG system 101 can abort the expansion of a trajectory to the third circle around a polygon vertex if the ATG system 101 determines a priori that, whatever the extension from the bypassing of this vertex, a shorter solution than that already found is not possible. This situation occurs when the sum of the current value G of the candidate trajectory considered plus the distance to the center of the third circle of the vertex concerned plus the distance from the center of this third circle to the center of one second circle (relative to the destination) is greater than the cost function F value of the already existing solution. The ATG system 101 can therefore calculate this sum and compare it with the cost function F of the already existing solution, and decide to abort or continue the expansion of the candidate trajectory considered to this polygon vertex (to bypass it).

In a fifth filtering embodiment, the ATG system 101 performs a filtering relating to the extreme polygon vertices. From the point of view of a considered position and direction of the aircraft 100, only the corners furthest to the right and to the left of an obstacle are to be considered to perform bypassing of the obstacle. The other vertices of the polygon can be excluded from the trajectory expansion search. It should be noted that if the vertical trajectory profile makes the aircraft 100 climb and a part of the obstacle considered is crossed (with the vertical margin VM) during the climb, the ATG system 101 considers only the extreme vertices of the edges which are cleared by the second filtering embodiment, not the extreme vertices of the complete polygon. It should also be noted that the extreme vertices are calculated by taking account of the trajectory of the aircraft 100 (and therefore of the turns that the aircraft 100 must perform) and of the lateral margin LM, and not simply the line of sight from the considered position of the aircraft 100. The two extreme vertices are determined by the ATG system 101 by considering only the aircraft 100 and the polygon considered. Next, if another obstacle is located on the path, that means simply that this other obstacle must first be bypassed, and the two extreme vertices of this other obstacle must be considered first.

In a particular embodiment, the ATG system 101 takes account of a dynamic nature of the meteorological obstacles in the trajectory calculation. Thus, the effective position of the polygons representing these meteorological obstacles can vary in time. To address this aspect, the polygons of the PDWDB database 204 are associated with a speed of movement vObst and with a direction of movement Dobst, obtained by analysis of radar images and comparison with meteorological models. When the direction of movement of the vertex points towards the interior of the polygon, there is no problem in arriving at the third circle around this vertex later than initially calculated. In fact, in such a case, the obstacle is further away from the aircraft 100 than initially considered and therefore the trajectory remains flyable. Conversely, if the direction of movement of the vertex points towards the outside of the polygon (with respect to the vertex concerned), arriving at the third circle around this vertex later than initially calculated risks resulting in a collision of the aircraft 100 with the meteorological obstacle. In considering dynamic obstacles, the calculation presented previously remains valid as long as it is possible to identify the point to be targeted: the point where the aircraft 100 and the targeted vertex of the obstacle arrive at the same time. The calculation is performed without considering the turns before the aircraft 100 reaches the vertex, nor the turns in leaving the vertex of the polygon during subsequent expansions. The calculation is thus performed by considering that the aircraft 100 is moving in a straight line. Since in reality there is typically a turn at the start of the expansion, a margin is introduced in the case where the direction of movement of the vertex points towards the outside of the polygon. To address this situation, when the ATG system 101 notes that the direction of movement of the vertex points towards the outside of the polygon with respect to the vertex concerned, the ATG system 101 adjusts the position of the vertex by moving it by a distance Lext in the direction of movement Dobst. The distance Lext is representative of an estimated movement of the obstacle during the period Δt between the time of arrival T0 on the vertex as calculated (in a straight line) and the real maximum time tmax of arrival on the vertex. The period Δt is defined by:

$$\Delta t = \frac{d_{max} - d_e}{A\_VEL}$$

in which dmax represents the maximum distance of the portion of trajectory considered (the maximum of the real distance, that is to say by including the turns) and de represents the Euclidean distance considered by calculating the time of arrival T0.

The above formula results in the distance Lext being calculated as follows:

$$Lext = vObst * \Delta t = vObst * \frac{d_{max} - d_e}{A\_VEL}$$

Figure 20:
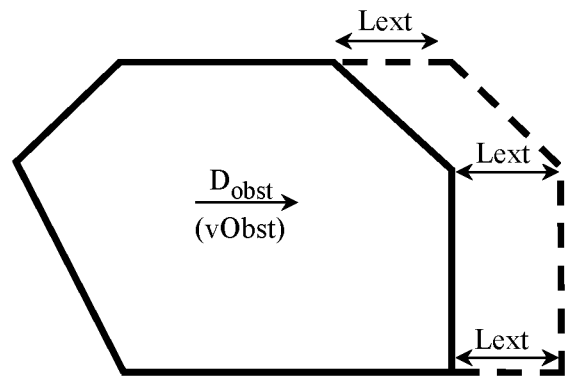
FIG. 20 schematically illustrates an extension of dimensions of a polygon to take account of an obstacle movement.
Figure 21:
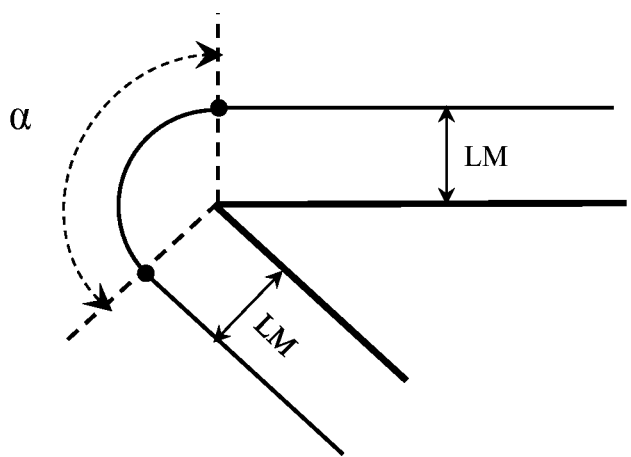
FIG. 21 schematically illustrates a maximum polygon vertex bypass angle to take account of an obstacle movement.

Thus, the ATG system 101 calculates the distance Lext and extends the dimensions of the polygon considered by applying to each vertex a shift equal to the distance Lext in the direction Dobst as soon as this shift moves the vertex towards the outside of the polygon (no movement towards the interior of the polygon), as schematically illustrated in FIG. 20. Furthermore, in a particular embodiment, the ATG system 101 also takes account of the need to bypass the vertex concerned to continue the trajectory in searching for the destination. This bypassing is at most characterized by an angle α as schematically illustrated in FIG. 21. In taking account of the speed A_VEL of the aircraft 100, the maximum vertex bypassing time Δtc is defined by:

$$\Delta t_c = \frac{\alpha * R}{A\_VEL}$$

in which R is the turn radius that the aircraft can perform. In the case where the turn radius R is greater than the lateral margin LM, the turn radius R is taken into account in the calculation. The turn radius R is at least equal to the lateral margin LM.

The above formula results in a supplementary distance Lextc being calculated as follows:

$$Lext_c = vObst * \Delta t_c = vObst * \frac{\alpha * R}{A\_VEL}$$

in which the angle α is expressed in radians. The angle α is the maximum angle of turn at the start of the subsequent expansions which have been performed from the vertex of the polygon concerned.

Thus, the ATG system 101 calculates the distance Lextc and extends the dimensions of the polygon considered in the same way as previously, by this time applying a shift equal to the sum of the distance Lext and of the supplementary distance Lextc in the direction Dobst (and not simply the distance Lext).

Thus, the ATG system 101 is able to search for a safe trajectory, despite having to face moving obstacles.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating a trajectory to bring an aircraft in flight from a current position of the aircraft to a destination having a georeferenced position, the method being implemented by an automatic trajectory generation system formed as electronic circuitry embedded in the aircraft, the method comprising the following steps:

obtaining polygons representative of obstacles potentially encountered by the aircraft from the current position of the aircraft to the destination, each polygon being associated with an altitude layer in which the obstacle is included in the polygon;

defining two first circles that are tangential with respect to a current direction of flight of the aircraft, one being centered on right side, another being centered on a left side, with respect to a current position of the aircraft, a radius of the first circles being a minimum turn radius that the aircraft can perform given its operational state;

defining two second circles that are tangential with respect to a direction to be followed to the destination, one being centered on the right side, the other being centered on the left side, with respect to the georeferenced position of the destination;

defining a third circle around vertices of the polygons, of radius equal to a maximum between a predetermined lateral margin and a turn radius that the aircraft can perform in light of a speed of the aircraft on arrival at a vertex of the polygon;

searching for a flyable lateral trajectory between the current position of the aircraft and the destination by bypassing the polygons by the vertices, by searching for tangential trajectories between the circles, by observing a pre-established vertical trajectory profile, the current direction of flight of the aircraft and the direction to be followed to the destination, as well as the predetermined lateral margin and a predetermined vertical margin with the polygons, and for at least one polygon edge, the method comprises the following steps:

calculating a distance between the current position of the aircraft and each polygon edge;

when the vertical trajectory profile corresponds to a climb, determining, as a function of the vertical trajectory profile, whether, after having travelled the distance to the edge minus the lateral margin, an altitude of the aircraft is greater than that of the edge plus the vertical margin, and if yes, excluding the edge from the search for a flyable lateral trajectory; or when the vertical trajectory profile corresponds to a descent, determining, as a function of the vertical trajectory profile, whether, after having travelled the distance to the edge plus the lateral margin, the altitude of the aircraft is lower than that of an altitude layer below the edge plus the vertical margin, and if yes, excluding the edge from the search for a flyable lateral trajectory, determining candidate trajectories by progression from circle to circle among said circles and storing the candidate trajectories in a list;

choosing from the list, a candidate trajectory to be continued which is most promising in light of a cost function F such that:

$$F = G + H$$

in which G is a distance travelled to a current end of the candidate trajectory and H is a path search heuristic which underestimates the distance still to be travelled to the destination, and when the automatic trajectory generation system has found a first safe candidate trajectory to a polygon vertex, saving its distance value, denoted Gv;

when the automatic trajectory generation system finds a second candidate trajectory which envisages meeting the vertex to bypass it with a current distance value, denoted Gp, testing the following condition:

$$Gp + d\min > Gv$$

in which dmin is a lower limit of path length between a position at which the trajectory considered stops and the vertex;

when the condition is fulfilled, conserving the unchanged list, and otherwise, replacing the first candidate trajectory with the second candidate trajectory in the list.

2. The method according to claim 1, further comprising the following successive steps:

expanding the polygons by the predetermined lateral margin in all the directions;

merging the polygons which touch or overlap by altitude layer to form merged polygons;

retracting the merged polygons by the predetermined lateral margin in all the directions.

3. The method according to claim 1, further comprising the following steps:

searching for a tangential flyable trajectory between one first circle and one second circle, by observing the pre-established vertical trajectory profile, the current direction of flight of the aircraft and the direction to be followed to the destination, as well as the predetermined lateral margin and a predetermined vertical margin with the polygons;

searching for the flyable trajectory, from the current position of the aircraft to the destination, by bypassing polygon vertices when no tangential flyable trajectory between one first circle and one said second circle has been found.

4. The method according to claim 1, further comprising the following steps:

when the automatic trajectory generation system has found a candidate trajectory to a polygon vertex, calculating a sum of the current value of G of the candidate trajectory concerned plus the distance to the third circle from the vertex concerned plus the distance from this third circle to one said second circle;

aborting an expansion of said candidate trajectory to said polygon vertex if the calculated sum is greater than a value of the cost function F of a trajectory already found to bring the aircraft in flight from the current position to the destination.

5. The method according to claim 1, comprising the following step:

keeping only the polygons of the layers which are relevant in light of a constant altitude or of an altitude interval defined by the vertical trajectory profile.

6. The method according to claim 1, wherein only corners furthest to a right and to a left of an obstacle are considered to perform a bypassing of the obstacle.

7. The method according to claim 1, further comprising the following steps, for at least one polygon representative of a meteorological obstacle moving at a speed vObst in a direction Dobst:

calculating a distance Lext as follows:

$$Lext = vObst * \frac{d_{max} - d_e}{A\_VEL}$$

in which dmax represents a maximum distance to the third circle centered on a vertex of the polygon concerned and de represents a Euclidian distance considered by calculating a time of arrival on said vertex and a maximum real time of arrival on said vertex and A_VEL represents the current speed of the aircraft;

extending dimensions of the polygon concerned by applying to each vertex a shift equal to the distance Lext in the direction Dobst as soon as this shift displaces said vertex outward from the polygon concerned.

8. The method according to claim 7, further comprising the following steps:

calculating a distance Lextc as follows:

$$Lext_c = vObst * \frac{\alpha * R}{A\_VEL}$$

in which α is a maximum turn angle, expressed in radians, that the aircraft can perform from the vertex of the polygon concerned and R represents the turn radius that the aircraft can perform;

extending the dimensions of the polygon by applying a shift equal to a sum of the distance Lext and of the additional distance Lextc as soon as this shift displaces said vertex outward from the polygon concerned.

9. An automatic trajectory generation system for bringing an aircraft in flight from a current position of the aircraft to a destination having a georeferenced position, said system comprising electronic circuitry configured to implement the following steps:

obtaining polygons representative of obstacles potentially encountered by the aircraft from the current position of the aircraft to the destination, each polygon being associated with an altitude layer in which the obstacle is included in said polygon;

defining two first tangential circles with respect to a current direction of flight of the aircraft, one being centered on the right, the other being centered on the left, with respect to the current position of the aircraft, a radius of the first circles being a minimum turn radius that the aircraft can perform in light of its operational state;

defining two second circles that are tangential with respect to a direction to be followed to the destination, one being centered on the right side, the other being centered on the left side, with respect to the georeferenced position of the destination;

defining a third circle around vertices of said polygons, of radius equal to a maximum between a predetermined lateral margin and a turn radius that the aircraft can perform in light of its speed on arrival at the vertex of the polygon;

searching for a flyable lateral trajectory between the current position of the aircraft and the destination by bypassing the polygons by the vertices by searching for tangential trajectories between said circles, by observing a pre-established vertical trajectory profile, the current direction of flight of the aircraft and the direction to be followed to the destination, as well as the predetermined lateral margin and a predetermined vertical margin with the polygons; and for at least one polygon edge, the system comprises electronic circuitry configured to implement the following steps:

calculating a distance between the current position of the aircraft and each polygon edge;

when the vertical trajectory profile corresponds to a climb, determining, as a function of the vertical trajectory profile, whether, after having travelled the distance to the edge minus the lateral margin, an altitude of the aircraft is greater than that of said edge plus the vertical margin, and, if yes, excluding the edge from the search for a flyable lateral trajectory; or when the vertical trajectory profile corresponds to a descent, determining, as a function of the vertical trajectory profile, whether, after having travelled the distance to the edge plus the lateral margin, the altitude of the aircraft is lower than that of an altitude layer below said edge plus the vertical margin, and, if yes, excluding the edge from the search for a flyable lateral trajectory, determining candidate trajectories by progression from circle to circle among said circles and storing the candidate trajectories in a list;

choosing from the list, a candidate trajectory to be continued which is most promising in light of a cost function F such that:

$$F = G + H$$

in which G is a distance travelled to a current end of the candidate trajectory and H is a path search heuristic which underestimates the distance still to be travelled to the destination, and when the automatic trajectory generation system has found a first safe candidate trajectory to a polygon vertex, saving its distance value, denoted Gv;

when the automatic trajectory generation system finds a second candidate trajectory which envisages meeting the vertex to bypass it with a current distance value, denoted Gp, testing the following condition:

$$Gp + d\min > Gv.$$

* * * * *